United States Patent
Flake et al.

(10) Patent No.: US 10,592,569 B2
(45) Date of Patent: *Mar. 17, 2020

(54) SEARCH GUIDED BY LOCATION AND CONTEXT

(71) Applicant: Microsoft Technology Licensing, LLC, Redmond, WA (US)

(72) Inventors: Gary Flake, Bellevue, WA (US); William H. Gates, III, Redmond, WA (US); Eric J. Horvitz, Kirkland, WA (US); Joshua T. Goodman, Redmond, WA (US); Surajit J. Chaudhuri, Redmond, WA (US); Trenholme J. Griffin, Bainbridge Island, WA (US); Oliver Hurst-Hiller, New York, NY (US); Kenneth A. Moss, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/392,654

(22) Filed: Dec. 28, 2016

(65) Prior Publication Data

US 2017/0300579 A1  Oct. 19, 2017

Related U.S. Application Data

(63) Continuation of application No. 14/506,448, filed on Oct. 3, 2014, now Pat. No. 9,536,004, which is a
(Continued)

(51) Int. Cl.
*G06F 16/9535* (2019.01)
*G06F 16/29* (2019.01)
(Continued)

(52) U.S. Cl.
CPC .......... *G06F 16/9535* (2019.01); *G06F 16/29* (2019.01); *G06F 16/444* (2019.01); *G06F 16/9537* (2019.01); *G06Q 30/0261* (2013.01)

(58) Field of Classification Search
None
See application file for complete search history.

(56) References Cited

U.S. PATENT DOCUMENTS 5,493,692 A   2/1996   Theimer et al.
5,544,321 A   8/1996   Theimer et al.
(Continued)

FOREIGN PATENT DOCUMENTS

EP   1288795 A1   3/2003
WO   WO69800787 A1   1/1998
WO   WO2006036216   4/2006

OTHER PUBLICATIONS

Benzinger, "Eurekster Swickis: Community Powered Search", Oct. 19, 2005, pp. 1-pp. 5.
(Continued)

*Primary Examiner* — Amresh Singh

(57) ABSTRACT

The subject disclosure pertains to web searches and more particularly toward influencing resultant content to increase relevancy. The resultant content can be influenced by reconfiguring a query and/or filtering results based on user location and/or context information (e.g., user characteristics/profile, prior interaction/usage temporal, current events, and third party state/context . . . ). Furthermore, the disclosure provides for query execution on at least a subset of designated web content, for example as specified by a user. Still further yet, a localized marketing system is disclosed that provides discount offers to users that match merchant criteria including proximity. A system for actively probing populations of users with different parameters and monitoring responses can be employed to collect data for identifying the best discounts and deadlines to offer to users to achieve desired results.

20 Claims, 17 Drawing Sheets

Related U.S. Application Data continuation of application No. 11/427,287, filed on Jun. 28, 2006, now Pat. No. 8,874,592.

(51) Int. Cl.
  *G06F 16/44* (2019.01)
  *G06F 16/9537* (2019.01)
  *G06Q 30/02* (2012.01)

(56) References Cited

U.S. PATENT DOCUMENTS

| | | | |
|---|---|---|---|
| 5,555,376 A | 9/1996 | Theimer et al. | |
| 5,603,054 A | 2/1997 | Theimer et al. | |
| 5,611,050 A | 3/1997 | Theimer et al. | |
| 5,812,865 A | 9/1998 | Theimer et al. | |
| 6,321,158 B1 | 11/2001 | DeLorme et al. | |
| 6,336,117 B1 * | 1/2002 | Massarani | G06F 17/30867 707/711 |
| 6,353,398 B1 | 3/2002 | Amin et al. | |
| 6,466,232 B1 | 10/2002 | Newell et al. | |
| 6,513,046 B1 | 1/2003 | Abbott, III et al. | |
| 6,549,915 B2 | 4/2003 | Abbott, III et al. | |
| 6,672,506 B2 | 1/2004 | Swartz et al. | |
| 6,691,106 B1 | 2/2004 | Sathyanarayan | |
| 6,741,188 B1 | 5/2004 | Miller et al. | |
| 6,745,178 B1 | 6/2004 | Emens et al. | |
| 6,747,675 B1 | 6/2004 | Abbott et al. | |
| D494,584 S | 8/2004 | Schlieffers et al. | |
| 6,791,580 B1 | 9/2004 | Abbott et al. | |
| 6,796,505 B2 | 9/2004 | Pellaumail et al. | |
| 6,801,223 B1 | 10/2004 | Abbott et al. | |
| 6,812,937 B1 | 11/2004 | Abbott et al. | |
| 6,837,436 B2 | 1/2005 | Swartz et al. | |
| 6,842,877 B2 | 1/2005 | Robarts et al. | |
| 6,934,684 B2 | 8/2005 | Alpdemir et al. | |
| 6,935,566 B1 | 8/2005 | Mulla et al. | |
| 6,965,868 B1 | 11/2005 | Bednarek | |
| 6,968,333 B2 | 11/2005 | Abbott et al. | |
| 7,010,501 B1 | 3/2006 | Roslak et al. | |
| 7,040,541 B2 | 5/2006 | Swartz et al. | |
| 7,063,263 B2 | 6/2006 | Swartz et al. | |
| 7,103,470 B2 | 9/2006 | Mintz | |
| 7,171,378 B2 | 1/2007 | Petrovich et al. | |
| 7,195,157 B2 | 3/2007 | Swartz et al. | |
| 7,385,501 B2 | 6/2008 | Miller et al. | |
| 7,409,384 B2 | 8/2008 | Szeto et al. | |
| 7,480,712 B2 | 1/2009 | Moy | |
| 7,516,010 B1 | 4/2009 | Kaplan et al. | |
| 7,525,450 B2 | 4/2009 | Miller et al. | |
| 7,529,639 B2 | 5/2009 | Rasanen et al. | |
| 7,640,511 B1 | 12/2009 | Keel et al. | |
| 7,693,752 B2 | 4/2010 | Jaramillo | |
| 7,702,536 B1 | 4/2010 | Alabraba et al. | |
| 9,141,704 B2 | 9/2015 | Meek et al. | |
| 9,396,269 B2 | 7/2016 | Meek et al. | |
| 2001/0030664 A1 | 10/2001 | Shulman et al. | |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2002/0032689 A1 | 3/2002 | Abbott, III et al. | |
| 2002/0035474 A1 | 3/2002 | Alpdemir | |
| 2002/0044152 A1 | 4/2002 | Abbott, III et al. | |
| 2002/0049644 A1 | 4/2002 | Kargman | |
| 2002/0049709 A1 | 4/2002 | Miyasaki et al. | |
| 2002/0052930 A1 | 5/2002 | Abbott et al. | |
| 2002/0052963 A1 | 5/2002 | Abbott et al. | |
| 2002/0054130 A1 | 5/2002 | Abbott, III et al. | |
| 2002/0054174 A1 | 5/2002 | Abbott et al. | |
| 2002/0065802 A1 * | 5/2002 | Uchiyama | G06F 16/9535 |
| 2002/0069117 A1 | 6/2002 | Carothers et al. | |
| 2002/0078045 A1 | 6/2002 | Dutta | |
| 2002/0078204 A1 | 6/2002 | Newell et al. | |
| 2002/0078525 A1 | 6/2002 | Hua et al. | |
| 2002/0080155 A1 | 6/2002 | Abbott et al. | |
| 2002/0080156 A1 | 6/2002 | Abbott et al. |
| 2002/0082930 A1 | 6/2002 | Park |
| 2002/0083025 A1 | 6/2002 | Robarts et al. |
| 2002/0083158 A1 | 6/2002 | Abbott et al. |
| 2002/0087525 A1 | 7/2002 | Abbott et al. |
| 2002/0099817 A1 | 7/2002 | Abbott et al. |
| 2002/0116287 A1 | 8/2002 | Schubert et al. |
| 2002/0128899 A1 | 9/2002 | Collings et al. |
| 2002/0138479 A1 | 9/2002 | Bates et al. |
| 2002/0143560 A1 | 10/2002 | Hanson et al. |
| 2002/0150050 A1 | 10/2002 | Nathanson |
| 2002/0191034 A1 | 12/2002 | Sowizral et al. |
| 2002/0194081 A1 | 12/2002 | Perkowski |
| 2002/0198814 A1 | 12/2002 | Bansal et al. |
| 2003/0004802 A1 | 1/2003 | Callegari |
| 2003/0013438 A1 | 1/2003 | Darby |
| 2003/0014307 A1 | 1/2003 | Heng |
| 2003/0046401 A1 | 3/2003 | Abbott et al. |
| 2003/0069877 A1 | 4/2003 | Grefenstette et al. |
| 2003/0071837 A1 | 4/2003 | Sorensen et al. |
| 2003/0125958 A1 | 7/2003 | Alpdemir et al. |
| 2003/0126250 A1 | 7/2003 | Jhanji |
| 2003/0135499 A1 | 7/2003 | Schirmer et al. |
| 2003/0154476 A1 | 8/2003 | Abbott, III et al. |
| 2003/0158796 A1 | 8/2003 | Balent |
| 2003/0171941 A1 | 9/2003 | Kraenzel et al. |
| 2003/0216960 A1 | 11/2003 | Postrel |
| 2004/0006478 A1 | 1/2004 | Alpdemir et al. |
| 2004/0024846 A1 | 2/2004 | Randall et al. |
| 2004/0030490 A1 | 2/2004 | Hegedus et al. |
| 2004/0041836 A1 | 3/2004 | Zaner et al. |
| 2004/0044658 A1 | 3/2004 | Crabtree et al. |
| 2004/0056905 A1 | 3/2004 | Lawrence |
| 2004/0070602 A1 | 4/2004 | Kobuya et al. |
| 2004/0148275 A1 | 7/2004 | Achlioptas |
| 2004/0198386 A1 | 10/2004 | Dupray |
| 2004/0201500 A1 | 10/2004 | Miller et al. |
| 2004/0225560 A1 | 11/2004 | Lewis et al. |
| 2004/0243580 A1 | 12/2004 | Markki et al. |
| 2004/0249559 A1 | 12/2004 | Mintz |
| 2005/0004838 A1 | 1/2005 | Perkowski et al. |
| 2005/0034078 A1 | 2/2005 | Abbott et al. |
| 2005/0038856 A1 | 2/2005 | Krishnasamy et al. |
| 2005/0064959 A1 | 3/2005 | Ortiz |
| 2005/0065959 A1 | 3/2005 | Smith et al. |
| 2005/0075932 A1 | 4/2005 | Mankoff |
| 2005/0091202 A1 | 4/2005 | Thomas |
| 2005/0091205 A1 | 4/2005 | Sidlosky et al. |
| 2005/0159970 A1 | 7/2005 | Buyukkokten et al. |
| 2005/0240512 A1 | 10/2005 | Quintero et al. |
| 2005/0251440 A1 | 11/2005 | Bednarek |
| 2005/0257240 A1 | 11/2005 | Faulkner et al. |
| 2005/0266858 A1 | 12/2005 | Miller et al. |
| 2005/0267816 A1 | 12/2005 | Jaramillo |
| 2005/0272442 A1 | 12/2005 | Miller et al. |
| 2005/0273351 A1 | 12/2005 | Chudnovsky et al. |
| 2005/0278443 A1 | 12/2005 | Winner et al. |
| 2005/0289113 A1 | 12/2005 | Bookstaff |
| 2006/0004703 A1 | 1/2006 | Spivack et al. |
| 2006/0004713 A1 | 1/2006 | Korte et al. |
| 2006/0019676 A1 | 1/2006 | Miller et al. |
| 2006/0069699 A1 | 3/2006 | Smadja et al. |
| 2006/0075034 A1 | 4/2006 | Lakkala et al. |
| 2006/0195385 A1 | 8/2006 | Khetrapal et al. |
| 2006/0195790 A1 | 8/2006 | Beaupre et al. |
| 2006/0218111 A1 | 9/2006 | Cohen |
| 2007/0005654 A1 | 1/2007 | Schachar et al. |
| 2007/0061246 A1 | 3/2007 | Ramer et al. |
| 2007/0061302 A1 | 3/2007 | Ramer et al. |
| 2007/0100798 A1 | 5/2007 | Kapur |
| 2007/0130182 A1 | 6/2007 | Forney |
| 2007/0136429 A1 | 6/2007 | Fine et al. |
| 2007/0192229 A1 | 8/2007 | Rowan |
| 2007/0233672 A1 | 10/2007 | Sanfacon et al. |
| 2007/0271235 A1 | 11/2007 | Frank et al. |
| 2008/0005071 A1 | 1/2008 | Flake et al. |
| 2008/0005074 A1 | 1/2008 | Flake et al. |
| 2008/0005104 A1 | 1/2008 | Flake et al. |
| 2008/0090591 A1 | 4/2008 | Miller et al. |

(56) References Cited

U.S. PATENT DOCUMENTS

| | | |
|---|---|---|
| 2008/0091537 A1 | 4/2008 | Miller et al. |
| 2008/0161018 A1 | 7/2008 | Miller et al. |
| 2009/0006413 A1 | 1/2009 | Andersen |
| 2010/0153832 A1 | 6/2010 | Markus et al. |
| 2015/0149430 A1 | 5/2015 | Flake et al. |

OTHER PUBLICATIONS

Billinghurst, et al., "An Evaluation of Wearable Information Spaces", Proceedings of the Virtual Reality Annual International Symposium, 1998, 8 pages.

M. Billinghurst, et al., An Evaluation of Wearable Information Spaces, Proceedings of the Virtual Reality Annual International Symposium, 1998, 8 pages.

Mark Billinghurst, et al., Wearbale Devices: New Ways to Manage Information, IEEE Computer Society, Jan. 1999, pp. 57-64.

Billinghurst, "Research Directions in Wearable Computing", University of Washington, May 1998, 48 pages.

Billinghurst, et al., "Wearable Devices—New Ways to Manage Information", IEEE Computer Society, Jan. 1999, pp. 57-64.

Chen, et al., "A Survey of Context-Aware Mobile Computing Research", Dartmouth Computer Science Technical Report, 2000, 16 pages.

Guanling Chen, et al., A Survey of Context-Aware Mobile Computing Research, Dartmouth Computer Science Technical Report, 2000, 16 pages.

Chen et al., LORE: An infrastructure to support location-aware services. IBM Journal of Research and Development. 2004;48(5/6):601-15.

Christiansen, Electronic finance: Economics and institutional factors. Financial Market Trends. 2002; 81: 45-80.

Dragoi, The continuum architecture: Towards enabling chaotic ubiquitous computing. Ph.D. Dissertation. University of Waterloo, Canada. 2005. 188 pages.

Gonzalo, A Business Outlook regarding Electronic Agents. Intl J Law Info Technol. 2001; 9(3): 189-203.

Harter, et al., "A Distributed Location System for the Active Office", IEEE Network, 1994, pp. 62-70.

Andy Harter, et al., A Distributed Location System for the Active Office, IEEE Network, 1994, pp. 62-70.

Henzinger, et al., "Query-Free News Search", May 24, 2003, ACM, pp. 1-10.

Horvitz, et al., "Attention-Sensitive Alerting in Computing Systems", Microsoft Research, Aug. 1999.

Eric Horvitz, et al., Attention-Sensitive Alerting in Computing Systems, Microsoft Research, Aug. 1999, 27 pages.

Eric Horvitz, et al., In Pursuit of Effective Handsfree Decision Support: Coupling Bayesian Inference, Speech Understanding, and User Models, 1995, 8 pages.

Horvitz, et al., "In Pursuit of Effective Handsfree Decision Support: Coupling Bayesian Inference, Speech Understanding, and User Models", 1995, 8 pages.

International Search Report dated Sep. 29, 2003 for PCT Application Serial No. 00/20685, 3 Pages.

Jayme, "The Monster Blog: Friends at Work" Jun. 16, 2005, <<http://replay.waybackmachine.org/20060329114258/http://monster.typepad.com/monsterblog/2005/06/friends_at_work.html>>, p. 1-2.

Joachims, "Text Categorization with Support Vector Machines: Learning with Many Relevant Features", LS-8 Report 23, Nov. 1997, 18 pages.

Joachims, "Text Categorization with Support Vector Machines: Learning with Many Relevant Features", Machine Learning, European Conference on Machine Learning, Apr. 21, 1998, pp. 137-142.

Keenoy,"Personalisation of Web Search", 2005, pp. 201-pp. 228.

Kurkovsky et al., Using ubiquitous computing in interactive mobile marketing. Personal and Ubiquitous Computing. 2006;10(4):227-40.

LI, Enterprise goes mobile: A framework and methodology for creating a mobile enterprise. D. Mgt. Dissertation. Lawrence Technological University, United State, Michigan. 2006. 216 pages.

Robert M. Losee, Jr., Minimizing information overload: the ranking of electronic messages, Journal of Information Science 15, Elsevier Science Publishers B.V., 1989, pp. 179-189.

Losee, "Minimizing information overload: the ranking of electronic messages", Journal of Information Science 15, Elsevier Science Publishers B.V., pp. 179-189.

Muller-Lankenau et al., Strategic channel alignment: an analysis of the configuration of physical and virtual marketing channels. Information Systems and eBusiness Management. 2006;4(2): 187-216.

Office action for U.S. Appl. No. 11/427,288, dated Mar. 7, 2014, Meek, et al., "Search Engine That Identifies and Uses Social Networks in Communications, Retrieval, and Electronic Commerce", 28 pages.

Office Action for U.S. Appl. No. 11/427,296, dated Apr. 1, 2011, Gary W. Flake, "Search Over Designated Content".

Office Action for U.S. Appl. No. 11/427,291, dated May 11, 2011, Christopher A. Meek, "Data Management in Social Networks".

Final Office Action for U.S. Appl. No. 11/427,287, dated Jan. 4, 2013, Gary W. Flake et al., "Search Guided by Location and Context", 28 pages.

Office action for U.S. Appl. No. 11/427,291, dated Nov. 17, 2014, Meek et al., "Data Management in Social Networks", 22 pages.

Office action for U.S. Appl. No. 11/427,288, dated Nov. 20, 2013, Meek, et al., "Search Engine That Identifies and Uses Social Networks in Communications, Retrieval, and Electronic Commerce", 26 pages.

Office action for U.S. Appl. No. 11/427,288 dated Nov. 6, 2015, Meek et al., "Search Engine That Identifies and Uses Social Networks in Communications, Retrieval, and Electronic Commerce", 28 pages.

Office action for U.S. Appl. No. 11/427,287, dated Dec. 4, 2013, Flake, et al., "Search Guided by Location and Context", 8 pages.

Office action for U.S. Appl. No. 11/427,291, dated Dec. 17, 2013, Meek, et al., "Data Management in Social Networks", 22 pages.

Office Action for U.S. Appl. No. 11/427,291, dated Dec. 23, 2011, Christopher A. Meek, "Data Management in Social Networks", 29 pgs.

Office Action for U.S. Appl. No. 11/427,288, dated Dec. 6, 2011, Christopher A. Meek, "Search Engine That Identifies and Uses Social Networks in Communications, Retrieval, and Electronic Commerce", 22 pgs.

Final Office Action for U.S. Appl. No. 14/506,448, dated May 19, 2016, Gary Flake, "Search Guided by Location and Context", 9 pages.

Office action for U.S. Appl. No. 11/427,288, dated May 28, 2013, Meek et al., "Search Engine That Identifies and Uses Social Networks in Communications, Retrieval, and Electronic Commerce", 27 pages.

Non-Final Office Action for U.S. Appl. No. 11/427,287, dated May 9, 2012, Gary W. Flake et al., "Search Guided by Location and Context", 35 pages.

Office action for U.S. Appl. No. 11/427,291, dated Jun. 17, 2013, Meek et al., "Data Management in Social Networks", 17 pages.

Office action for U.S. Appl. No. 11/427,287, dated Jun. 21, 2013, Flake et al., "Search Guided by Location and Context", 31 pages.

Non-Final Office Action for U.S. Appl. No. 11/427,288, dated Jun. 27, 2011, Christopher A. Meel, "Search Engine That Identifies and Uses Social Networks in Communications, Retrieval, and Electronic Commerce".

Office action for U.S. Appl. No. 11/427,288, dated Jun. 29, 2015, Meek et al., "Search Engine That Identifies and Uses Social Networks in Communications, Retrieval, and Electronic Commerce", 26 pages.

Office action for U.S. Appl. No. 14/506,448, dated Aug. 28, 2015, Flake et al., "Search Guided by Location and Context", 13 pages.

Final Office Action for U.S. Appl. No. 11/427,296, dated Sep. 15, 2011, "Search Over Designated Content", 16 pages.

(56) References Cited

OTHER PUBLICATIONS

Office action for U.S. Appl. No. 11/427,288, dated Sep. 4, 2014, Meek, et al., "Search Engine That Identifies and Uses Social Networks in Communications, Retrieval, and Electronic Commerce", 30 pages.
Office Action dated Feb. 17, 2009, for U.S. Appl. No. 11/427,291, 23 pages.
Parameswaran, et al., "P2P Networking: An Information-Sharing Alternative", IEEE Computer Society Press, Computer, vol. 34, Issue 7, 2001, pp. 31-38.
International Search Report dated Sep. 29, 2003 for PCT Application Serial No. 00/0685, 3 pages.
Rhodes, et al., "Remembrance Agent: A continuously running automated information retrieval system", The Proceedings of the First International Conference on the Practical Application of Intelligent Agents and Multi-Agent Technology, 1996, pp. 487-495.
Bradley J. Rhodes, Remembrance Agent: A continuously running automated information retrieval system, The Proceedings of the First International Conference on teh Practical Applicatio of Intelligent Agents and Multi Agent Technology, 1996, pp. 487-495.
Rhodes, "The wearable remembrance agent: a system for augmented memory", Personal Technologies Journal Special Issue on Wearable Computing, 1997, 12 pages.
Schilit, "A System Architecture for Context-Aware Mobile Computing", Columbia University, 1995. 153 pages.
Schilit, et al., "Context-Aware Computing Applications", In Proceedings of the Workshop on Mobile Computing Sysems and Applications, Dec. 1994. oo. 85-90.
Schilit, et al., "Customizing Moble Applications", Proceedings USENIX Symposium on Mobile and Location Independent Computing, Aug. 1993, 9 pages.
Schilit, et al., "Disseminating Active Map Information to Mobile Hosts", IEEE Network, 1994, pp. 22-32, vol. 8—No. 5.
Bill Schilit, et al., Context-Aware Computing Applications, In Proceedings of the Workshop on Mobile Computing Systems and Applications, Dec. 1994. pp. 85-90.
Bill N. Schilit, et al., Customizing Mobile Applications, Proceedings USENIX Symposium on Mobile and Location Independent Computing, Aug. 1993, 9 pages.
Bill N. Schilit, et al., Disseminating Active Map Information to mobile Hosts, IEEE Network, 1994, pp. 22-32, vol. 8—No. 5.
Bill N. Schilit, et al., The ParcTab Mobile Computing System, IEEE WWOS-IV, 1993, 4 pages.
Schilit, et al., "The PARC TAB Mobile Computing System", IEEE WWOS-IV, 1993, 4 pages.
Secker, Does m-commerce know where it's going? Telecommun Intl. 2001; 35(4): 85-88.
Shugan, The Impact of Advancing Technology on Marketing and Academic Research. Marketing Science. 2004;23(4):469-75.
Simon, Sinking your teeth into m-commerce. Intell Enter. 2000;3(13):60-63.
SLI Systems, "Eurekster Launches Fitst Internet Search Engine Powered by Social Networks", Jan. 21, 2004, pp, 1-pp. 4.
Spreitzer, et al., "Architectural Considerations for Scalable, Secure, Mobile Computing with Location Information", In the 14th International Conference on Distributed Computing Systems, Jun. 1994, pp. 29-38.
Spreitzer, et al., "Providing Location Information in a Ubiquitous Computing Environment", SIGOPPS '93, 1993, pp. 270-283.
Spreitzer, "Scalable, Secure, Mobile Computing with Location Information", Communications of the ACM, Jul. 1993, 1 page, vol. 36—No. 7.
Starner, "Wearable Computing and Contextual Awareness", Massachusetts Institute of Technology, Jun. 1999, 248 pages.
Sullivan, "Eurekster Launches Personalized Search", Jan. 21, 2004, pp. 1-pp. 4.
Theimer, et al., "Operating System Issues for PDAs", In Fourth Workshop on Workstation Operating Systems, 1993, 7 pages.
Upadrashta, et al., "Social Networks in Peer-to-Peer Systems", In the Proceedings of the 38th Annual Hawaii International Conference on System Sciences, vol. 7, 2005, pp. 200c, pp. 1-9.
Want, et al., "Active Badges and Personal Interactive Computing Objects", IEEE Transactions on Consumer Electronics, 1992, 11 pages, vol. 38—No. 1.
Roy Want, et al., The Active Badge Location System, ACM Transactions on Information Systems, Jan. 1992, pp. 91-102, vol. 10—No. 1.
Want, et al., "The Active Badge Location System", ACM Transactions on Information Systems, Jan. 1992, pp. 91-102, vol. 10—No. 1.
Weiser, "Some Computer Science Issues in Ubiouitous Computing", Communications of the ACM, Jul. 1993, pp. 75-84, vol. 36—No. 7.
Weiser, "The Computer for the 21st Century", Scientific American, Sep. 1991, 8 pages.
Wieland, Where is the nearest LBS provider? Telecommun Intl. 2001; 35(9):20-22.
Workshop on Wearable Computing Systems, Aug. 19-21, 1996, Available at: http://wearcam.org/computing/workshop/schedule.html, 3 pages.
Young, Handicapping M-commerce. Wireless Rev. 2000; 17(15):24-30.
"Final Office Action Issued in U.S. Appl. No. 11/427,287", dated Jun. 9, 2009, 18 Pages.
"Final Office Action Issued in U.S. Appl. No. 11/427,287", dated Mar. 15, 2011, 33 Pages.
"Final Office Action Issued in U.S. Appl. No. 11/427,287", dated Jun. 2, 2010, 23 Pages.
"Non Final Office Action Issued in U.S. Appl. No. 11/427,287", dated Oct. 6, 2010, 26 Pages.
"Non Final Office Action Issued in U.S. Appl. No. 11/427,287", dated Sep. 23, 2011, 33 Pages.
"Non Final Office Action Issued in U.S. Appl. No. 11/427,287", dated Dec. 8, 2009, 16 Pages.
"Non Final Office Action Issued in U.S. Appl. No. 11/427,287", dated Jan. 30, 2009, 15 pages.
"Notice of Allowance Issued in U.S. Appl. No. 11/427,287", dated Jun. 25, 2014, 5 Pages.
"Final Office Action Issued in U.S. Appl. No. 11/427,290", dated Dec. 9, 2010, 20 Pages.
"Non Final Office Action Issued in U.S. Appl. No. 11/427,290", dated Sep. 26, 2011, 26 Pages.
"Non Final Office Action Issued in U.S. Appl. No. 11/427,290", dated Jun. 22, 2010, 26 Pages.
"Notice of Allowance Issued in U.S. Appl. No. 14/506,448", dated Aug. 24, 2016, 17 Pages.
"Final Office Action Issued in U.S. Appl. No. 11/427,288", dated Oct. 16, 2009, 22 Pages.
"Non-Final Office Action Issued in U.S. Appl. No. 11/427,288", dated Feb. 20, 2009, 13 Pages.
"Final Office Action Issued in U.S. Appl. No. 11/427,291", dated Oct. 27, 2010, 30 Pages.
"Final Office Action Issued in U.S. Appl. No. 11/427,291", dated Sep. 14, 2009, 23 Pages.
"Non-Final Office Action Issued in U.S. Appl. No. 11/427,291", dated Apr. 15, 2010, 26 Pages.
"Final Office Action Issued in U.S. Appl. No. 11/427,296", dated Jun. 24, 2010, 13 Pages.
"Final Office Action Issued in U.S. Appl. No. 11/427,296", dated Sep. 17, 2009, 14 Pages.
"Non Final Office Action Issued in U.S. Appl. No. 11/427,296", dated Apr. 3, 2009, 11 Pages.
"Non Final Office Action Issued in U.S. Appl. No. 11/427,296", dated Dec. 30, 2009, 12 Pages.

\* cited by examiner

SEARCH GUIDED BY LOCATION AND CONTEXT

RELATED APPLICATIONS

This application is a continuation of U.S. patent application Ser. No. 14/506,448, filed Oct. 3, 2014, and entitled "Search Guided by Location and Context," which is a continuation of U.S. patent application Ser. No. 11/427,287, filed Jun. 28, 2006, now U.S. Pat. No. 8,874,592, and entitled "Search Guided by Location and Context", which are both incorporated herein by reference their entirety.

CROSS-REFERENCE TO RELATED APPLICATIONS

This application is related to U.S. application Ser. No. 11/427,296, filed Jun. 28, 2006, entitled "SEARCH OVER DESIGNATED CONTENT," and U.S. application Ser. No. 11/427,290, filed Jun. 28, 2006 entitled "LOCALIZED MARKETING." The entireties of these applications are incorporated herein by reference.

BACKGROUND

The Internet and World Wide Web continue to expand rapidly with respect to both volume of information and number of users. The Internet is a collection of interconnected computer networks. The World Wide Web, or simply the web, is a service that connects numerous Internet accessible sites via hyperlinks and uniform resource locators (URLs). As a whole the web, provides a global space for accumulation, exchange and dissemination of all types of information. For instance, information can be provided by way of online newspapers, magazines, advertisements, books, pictures, audio, video and the like. The increase in usage is largely driven by the increase in available information pertinent to user needs. By way of example, the web and Internet was initially utilized solely by researches to exchange information. At present, people of all occupations and lifestyles utilize the web to mange their bank accounts, complete their taxes, view product information, sell and purchase products, download music, take classes, research topics, and find directions, among other things. Further, usage will continue to flourish as additional relevant information becomes available over the web.

To maximize likelihood of locating relevant information amongst an abundance of data, search engines are often employed over the web or a subset of pages thereof. In some instances, a user is aware of the name of a site, server or URL to the site that the user desires to access. In such situations, the user can access the site, by simply entering the URL in an address bar of a browser and connecting to the site. However, in most instances, the user does not know the URL or site name that includes the desired information. To locate a site or corresponding URL of interest, users often employ a search engine to facilitate locating and accessing sites based on keywords and operators.

A web search engine, or simply a search engine, is a tool that facilitates web navigation based on entry of a search query comprising one or more keywords. Upon receipt of a query, the search engine retrieves a list of websites, typically ranked based on relevance to the query. To enable this functionality, the search engine must generate and maintain a supporting infrastructure.

Search engine agents, often referred to as spiders or crawlers, navigate websites in a methodical manner and retrieve information about sites visited. For example, a crawler can make a copy of all or a portion of websites and related information. The search engine subsequently analyzes the content captured by one or more crawlers to determine how a page will be indexed. Indexing transforms website data into a form, the index, which can be employed at search time to facilitate identification of content. Some engines will index all words on a website while others may in only index terms associated with particular tags (e.g., title, header or meta-tag). Crawlers must also periodically revisit web pages to detect and capture changes thereto since the last indexing.

Upon entry of one or more keywords as a search query, the search engine retrieves information that matches the query from the index, ranks the sites that match the query, generates a snippet of text associated with matching sites and displays the results to a user. Furthermore, advertisements relating to the search terms can also be displayed together with the results. The user can thereafter scroll through a plurality of returned sites, ads and the like in an attempt to identify information of interest. However, this can be an extremely time-consuming and frustrating process as search engines can return a substantial number of sites. More often then not, the user is forced to narrow the search iteratively by altering and/or adding keywords and operators to obtain the identity of websites including relevant information.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject innovation pertains to location and/or context based search. Given the ever-increasing amount of information available on the web and how the size of this information in total outpaces display real estate, bandwidth, memory and processing capabilities, the need for relevant information becomes more critical. According to an aspect of the subject innovation, returned web content (e.g., results, advertisements . . . ) can be limited, filtered or constrained to data that is either or both of near and relevant. More specifically, a search engine can interact with a location component to receive a location of a user, or alternatively a location of interest, and utilize this information to affect the resulting web content. Additionally or alternatively, context information including but not limited to user, temporal, current events and third party context can be utilized to identify relevant content.

In accordance with another aspect of the subject innovation, a web search can be evaluated with respect to designated content. Rather then evaluating a query with respect all web content located by crawlers, select web content can be specified by a user or otherwise determined or inferred. In this manner, results can be delivered that are most likely to include information a user desires. Furthermore, the query can be evaluated with respect to content that may not have been identified by search engine crawlers.

According to yet another aspect, a localized marketing service is disclosed herein. The marketing service matches merchant and user settings including location or proximity and transmits electronic discount offers or coupons to matching users (e.g., via SMS . . . ). The service can be optimized to maximize utility for one or more of the users, merchants and the service.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Given large volumes of information available over the web, there exists a need for mechanisms that restrict content (e.g., web content, query results, advertisements . . . ) to that most relevant to a user. The subject innovation provides such mechanisms that facilitate filtering content based on a bounded location alone or in combination with other contextual information (e.g., user profile, usage, preferences, tolerance, temporal, third-party, current events . . . ). In this manner, content can be supplied to a user that is both near and relevant. Further, note that provided content may vary in real-time as the bounded region and/or context change.

Figure 1:
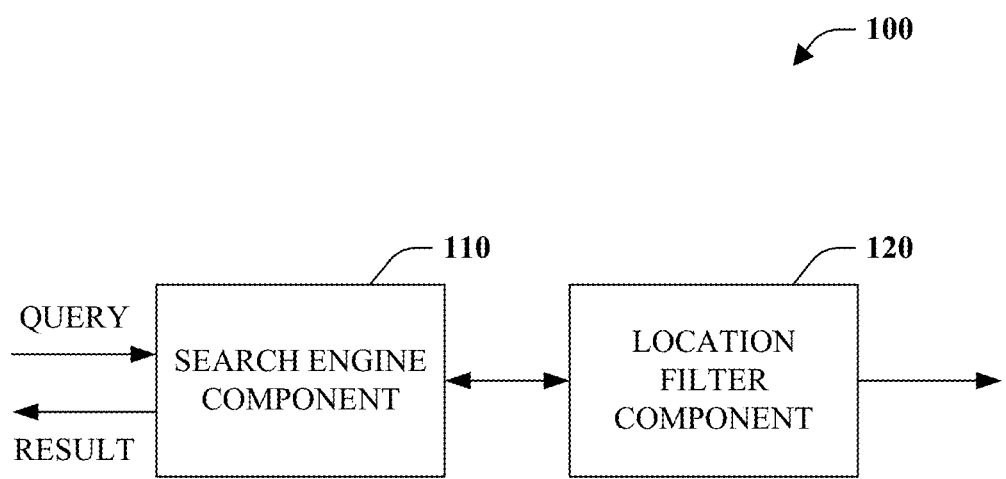
FIG. 1 is a block diagram of a web search system influenced by user location.

Referring initially to FIG. 1, a web search system 100 is illustrated in accordance with an aspect of the subject innovation. The web search system 100 includes a search engine component 110 and a location filter component 120 to enable queries, results, advertisements and the like to be influenced by location. The search engine component 110 receives queries and returns results. Similar to a conventional search engine, component 110 evaluates the received search query to locate relevant web content including but not limited to websites, advertisements, blogs, images, audio and video. While the search engine component 120 can simply be responsive to requests for information via queries, it is also to be noted that the search engine component 120 can re-execute a query periodically (e.g., predetermined intervals, varying intervals, upon change . . . ) to ensure resulting web content is current and relevant based on changing circumstances, as will be discussed further infra. Results generated by the re-execution can be provided immediately to a user or alternatively cached to facilitate expeditious update. Furthermore, search engine component 120 can update all or portion of results at the same or disparate times. For example, relevant advertisements may be updated more frequently than other identified web content. The search engine component 110 is communicatively coupled to the location filter component 120.

The location filter component 120 facilitates identification of a present physical location of a user and/or geographical region associated with the user's location or simply of interest thereto. Such location data can subsequently be employed to influence web content returned with respect to a query, for instance. Web content can be made more relevant to a user by focusing the content on one or more particular regions or locations. For example, if a user generates a query for "fast food," results provided for that user's location are the most relevant and useful. The filter component 120 can affect search results in one or more of a plethora of disparate manners. In one instance, the location filter component 120 can modify a received search query to include such location information. Additionally or alternatively, the filter component 120 can filter web content after it is produced as a result of query evaluation. Still further yet, the search engine component 120 can be configured to receive location information and automatically filter or influence a query based thereon.

Figure 2:
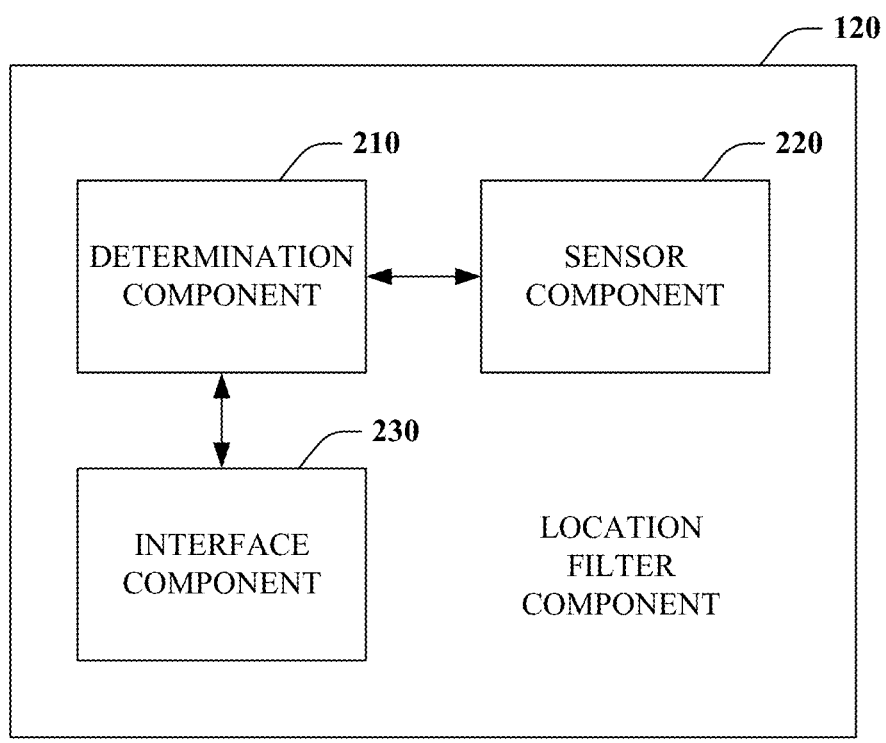
FIG. 2 is a block diagram of a location filter component.

FIG. 2 depicts a location filter component 120 in further detail in accordance with an aspect of the subject invention. The location filter component 120 includes a determination component 210 that facilitates identifying or ascertaining a location and/or bounded region associated with or alternatively of interest to a user. Such a determination can be based on supplied or retrieved information. In one instance, location information can be provided from communicatively coupled sensor component 220. Sensor component 220 supplies or otherwise facilitates supply of sensed information to determination component 210 that can interpret the data and identify a location. The determination component 220 is also coupled to interface component 230 to enable users to actively specify a location and/or region of interest. The interface component 230 can correspond to a graphical user interface (GUI) to aids location identification, among other things.

Further, while a query can be bounded by a predetermined or default distance from an identified location (if not specifically identified), it should also be noted that the distance could be variable based on one or more factors. For instance, the determination component 220 can utilize a received query, or keywords thereof, to facilitate identifying an appropriate bounded region. By way of example, if a query pertains to fast food, it is likely that a user wishes to dine somewhere close thus; the bounded region would be small. By contrast, if a query pertains to vehicles (e.g., cars, boats, motorcycles . . . ), it is likely that a user would travel farther to view and/or purchase such an item. Accordingly, the search area for vehicles would be much larger than it was for the fast food query.

Figure 3:
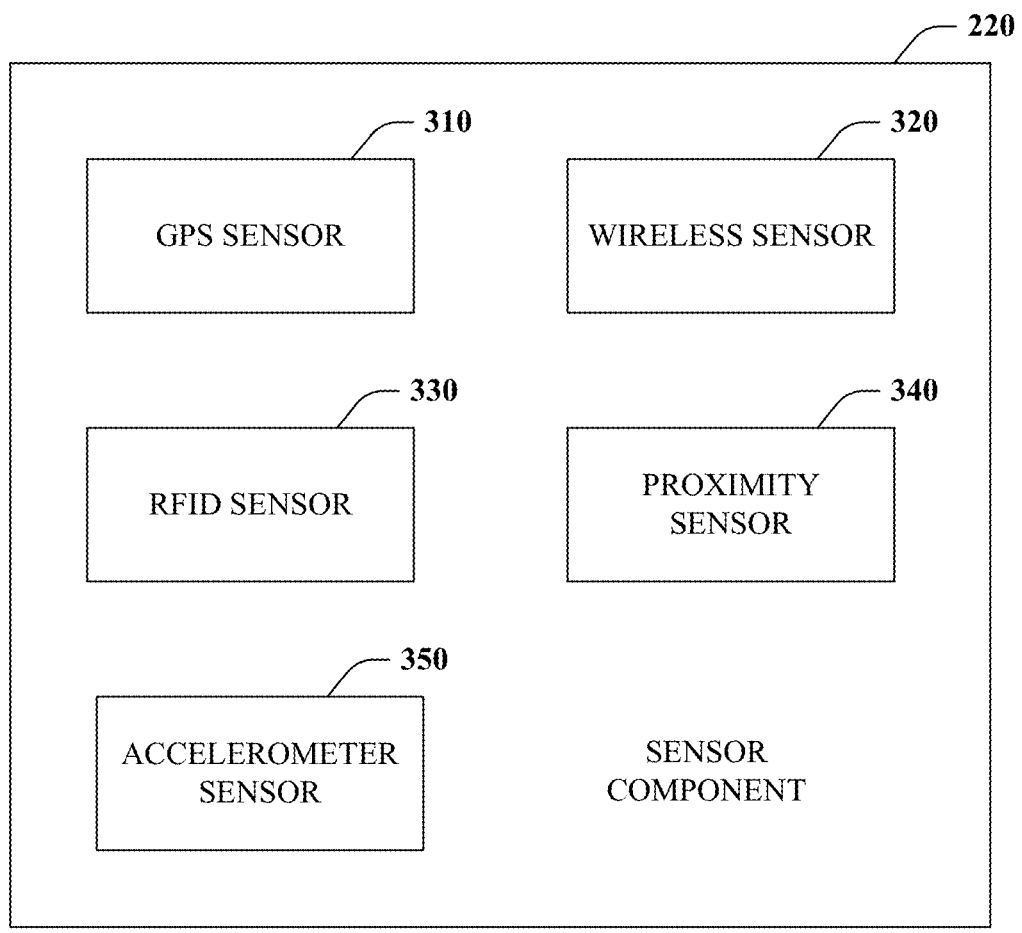
FIG. 3 is a block diagram of a sensor component.

FIG. 3 illustrates a sensor component 220 in accordance with an aspect of the subject innovation. As previously mentioned, the sensor component 220 can provide the determination component 210 with sensed data to aid in ascertaining a location. In particular, the sensor component 220 can include or in the alternative be communicatively coupled to global positioning system (GPS) sensor 310, wireless sensor 320, radio frequency identification (RFID) sensor 330, and proximity sensor 340. These sensors can be employed individually or in combination to obtain a more comprehensive view of a user location. The GPS sensor 310 can receive or retrieve location information from a global positioning system based on a device associated with a user (e.g., mobile phone, computer, PDA, pager, watch . . . ). Similarly, wireless sensor 320 can receive or otherwise obtain data from one or more received or transmitted wireless signals, for example associated with a user phone or other computing device, among other things. Wireless signal information can be triangulated to enable identification of an approximate location. The RFID sensor 330 can receive or retrieve location data from a radio frequency tag or other like device associated with a user. Still further yet, user location can also be sensed based data provided by proximity sensor 340. A proximity sensor 340 can detect presence within an area of the sensor based on an active or passive device carried by a user, facial, voice or other types of recognition systems.

In addition, sensor component 220 can include an accelerometer sensor component 350 that can receive or retrieve user movement information from an accelerometer or other like device. Along with location information, movement information can be employed to determine or predict where a user is going and how long it will take them to arrive, inter alia. This enables timely delivery of relevant content to a user based on current and/or future location. For example, if a user enters a query for restaurants as he/she is traveling a highway the search region can be targeted to restaurants within a short distance from the highway that will be approached within a predetermined time given a sensed speed.

Figure 4:
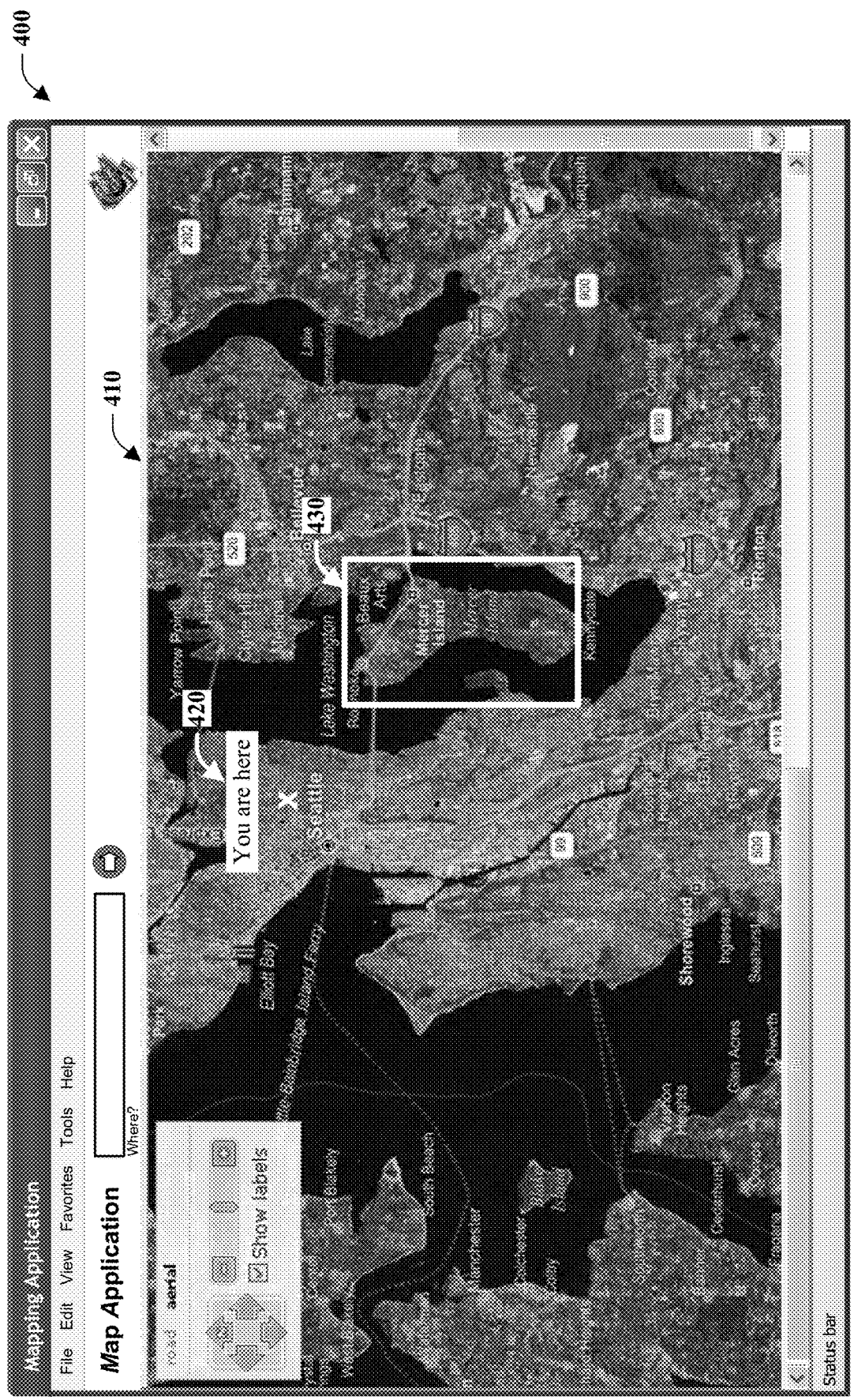
FIG. 4 is an exemplary screenshot illustrating identification of a geographic region of interest.

Turning attention to FIG. 4, an exemplary screenshot 400 is illustrated in accordance with an aspect of the subject innovation. As previously, mentioned, a user may desire to specifically identify an area of interest. Screenshot 400 depicts a generic map application GUI that can be employed to identify a particular location via a map 410. While a present user location can be determined (e.g., via GPS, wireless, IP address, RFID . . . ) and identified on the map, as shown at reference numeral 420, this may or may not be a location of interest to a user at a given time. The subject innovation supports user identification of a location, region or area of interest in a myriad of different manners. For instance, a user may interact with the map application (e.g., move, zoom in, zoom out . . . ) such that the area displayed corresponds to the area of interest. Alternatively, a user can identify a particular area by utilizing an application tool to draw a polygon, circle or other standard or non-standard shape around the particular area of interest. Such mechanism can also be employed in combination, to indicate levels of interest. For example, the area captured by a rectangle at 430 (here Mercer Island) can be primary and most relevant area of interest while the rest of the area displayed can be a secondary area of interest. Furthermore, multiple areas can be identified by shape capture, for example, and include designated priority or relevance data.

Figure 5:
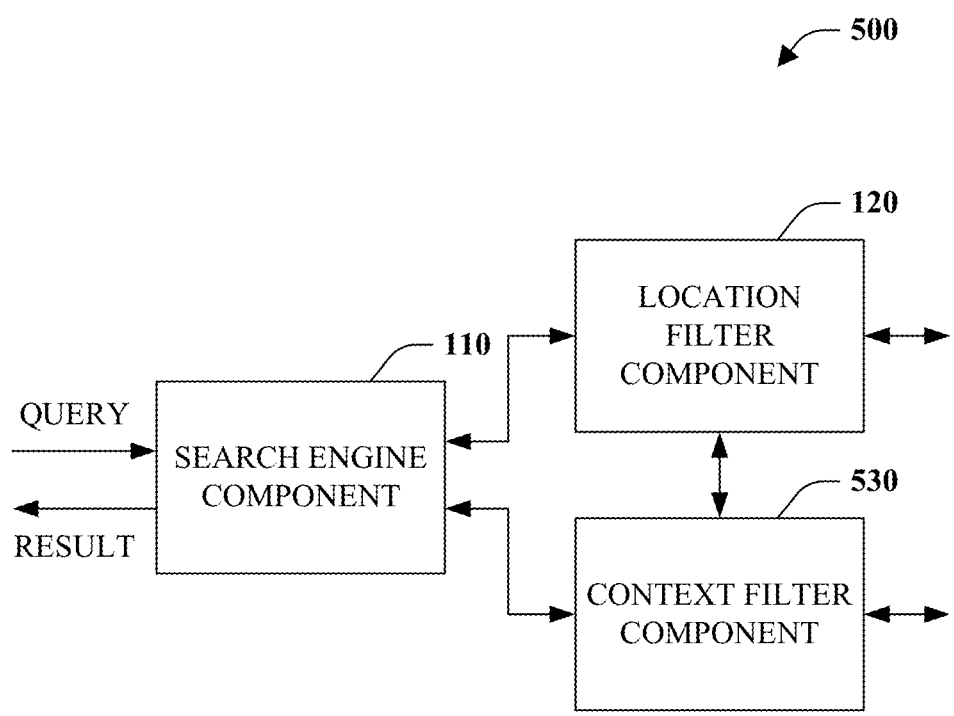
FIG. 5 is a block diagram of a web search system influenced by location and context.

FIG. 5 depicts a web search system 500 in accordance with an aspect of the innovation. Similar to system 100 of FIG. 1, system 500 includes the search engine component 110 and the location filter component 120, as previously described. In brief, the search engine component 110 is operable to receive and satisfy user queries. Resulting web content can be affected by the location filter component that focuses relevant results on one or more particular locations or geographical areas. In addition, system 500 includes context filter component 510 communicatively coupled to one or both of the search engine component 110 and the location filter component 120. The context filter component 110 can further influence the results provided by the search engine component. More specifically, context or information pertaining to state, setting or circumstances surrounding a query can be employed to affect rendered web content. Context information can be provided, determined and/or inferred (as that term is defined herein) and utilized to improve the relevancy of web content pushed to a user.

Figure 6:
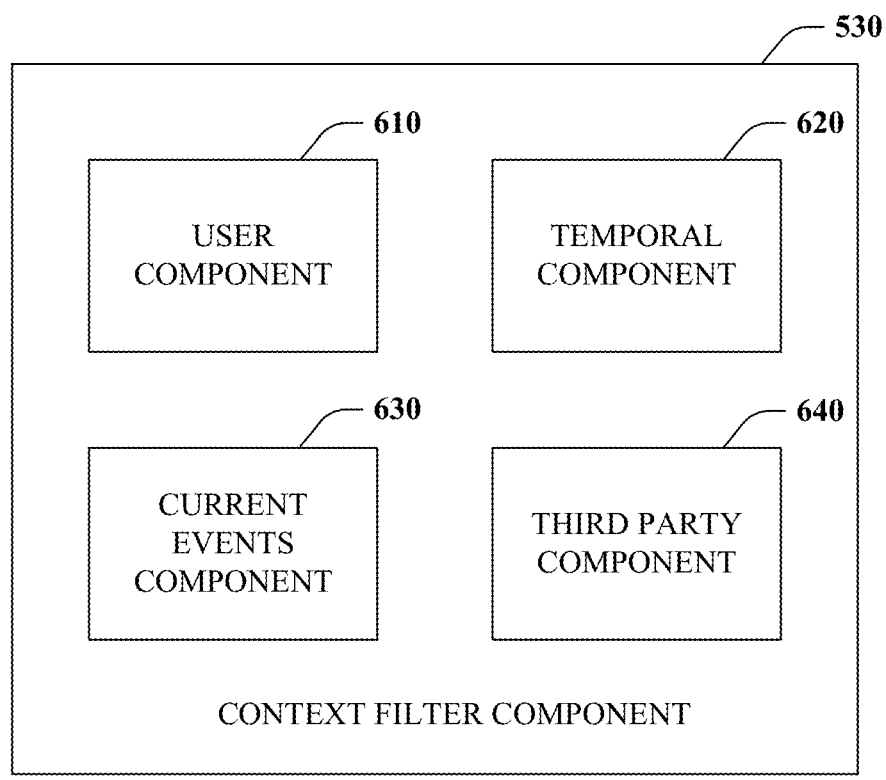
FIG. 6 is a block diagram of a context filter component.

FIG. 6 illustrates an exemplary context component 530 in accordance with an aspect of the subject innovation. It should be appreciated the context component 530 can include several sub-components that facilitate receipt, retrieval, determination and/or prediction of specific types of contextual information. Although not limited thereto, the context component 530 can include a user component 610, a temporal component 620, a current events component 630 and a third party component 640.

Figure 7:
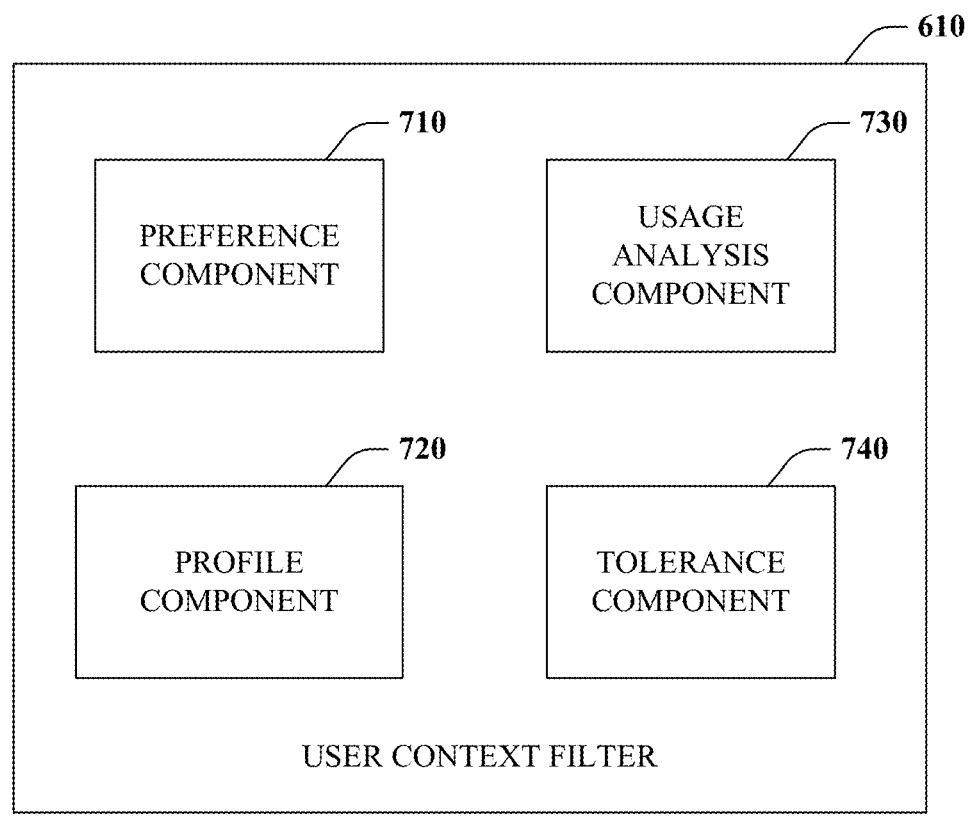
FIG. 7 is a block diagram of a user-context filter component.

User component 610 pertains to determining information about a user initiating a query. Such context information enables provided web content to be tailored or personalized for each user. By way of example and not limitation, resulting web content including identified websites and advertisements can be tailored to a known or inferred age of the user. Turning briefly to FIG. 7, an exemplary user context component 610 is depicted in accordance with an aspect of the innovation. As shown the component 610, includes preference component 710, user profile component 720, usage component 730 and tolerance component 740.

The preference component 710 provides a mechanism for identifying user preferences. As with other context information described herein, such preferences can be user specified or automatically determined. For example, preference information can include the search language, the number of results, how results are to be displayed (e.g., presentation, same window, new window . . . ), and type of filters to be applied, among other things. In one instance, a user can specify such preference utilizing a graphical user interface (GUI), wizard or the like. If not identified, default preferences can be employed or the preferences can be inferred. For instance, if the query is specified in English, then it is likely that the user will want to return English language content.

User profile component 720 obtains or infers particular information about a user. Such information can include but is not limited to age, gender, educational level, religion, occupation, ethnicity, likes, dislikes, and political ideology.

Again, such information can be employed to tailor web content to a user. For example, content can be censored for particular age groups such that explicit, sexual, violent, etc. content is not returned to a thirteen-year-old user. In another instance, advanced research papers, doctoral dissertations, and the like can be filtered such that they are not returned to someone in middle school or with less than a high school education. It is to be appreciated that user profile or characteristic information can be inferred based on queries, accessed web content, and/or other known data, among other things. For instance, if the age of the user can be determined within a threshold level of confidence then other things such as likes, dislikes, and educational level, among other things can be inferred.

Usage analysis component 730 provides a mechanism to influence provided web content based on past interaction. For example, a user bookmarks, history, cached content and the like can be utilized to identify past web content interaction. Such information can be helpful in identifying user characteristics as well as content that may be relevant to a user. For example, bookmarked websites can be noted as trusted web sites such that those sites and sites that link to those sites are ranked higher in relevancy.

Tolerance component 740 assesses a user's attention span, cognitive load and/or attention span. Based on the assessment, the amount of web content presented to a user can be adjusted. By way of example, if it is determined that a user typically only views the first five listed websites, then the system can filter the results such that the only five websites are presented. Similarly, while web content such as advertisements can be continually pushed to a user, advertisements that are displayed within a time period identified as the user's attention span (e.g., first minute) can cost advertisers more than those displayed outside that span (e.g., prorated based on attention span).

Referring back to FIG. 6, the temporal component 620 can be employed to identify and filter based on time or time based events. For example, it can be noted that a holiday such as Valentine's Day is approaching and as a result influence web content based thereon such as by advertisements for flowers, candy or the like. Of course, the temporal component 620 can be utilized in conjunction with other provided or inferred context information, such that relevant content can be provided for events personal to a user such as but not limited to birthdays and anniversaries. Furthermore, results can be biased based on past usage at particular times of varying granularity including but not limited to dates, days of the week, and/or time of day.

In addition to regularly occurring events, web content can be biased additionally or alternatively by current events via current events component 630. Current events component 630 can monitor nationwide and/or local news wires amongst other outlets such that the information obtained can be utilized to filter web content provided to a user. In one exemplary scenario, if a terrorist threat has been identified for sporting arenas across the country and a user searches for a team website to buy tickets to a game, any content regarding the identified terrorist threat can also be provided as highly relevant information.

Third-party component 640 provides a mechanism for filtering content based on state/context of one or more people who are not a user. For instance, a user can be associated with a group (family, friends, co-workers, professional associations, engaged in a common activity, part of a working collaboration . . . ) and context information related to the group and/or individual members can be employed to filter content provided to a user. Such information can be obtained from one or more websites in one implementation. Furthermore, context associated with group members closer in proximity to the user can be deemed more relevant and thus have more of an affect on provided web content. In one exemplary implementation, this can be accomplished by comparing centrally stored location information and group membership, and applying filters associated with the group or individuals of the group when the come within a threshold distance of the user. Alternatively, computing devices may directly communicate their presence and/or transmit necessary context information, for instance via infrared or other transmission media or mechanism.

It is to be noted that the subject innovation is not limited to the components and/or context information identified with respect to FIGS. 6 and 7. Various other types of context information can be employed with respect to the innovation and is to be considered within the scope of the appended claims. By way of example and not limitation, context information pertaining to the device a user is employing can be obtained, determined or inferred and utilize to filter and format web content. For instance, if the device is a mobile phone less and/or different content can be displayed to a user. Furthermore, specific context components or portions thereof, described supra, can interact and/or cooperate to enable specification and identification of context information. For example, knowledge that a user is only thirteen-years-old can be utilized to infer an education level of less than high school. Similarly, the components can interact to facilitate identification and correction or notification of inconsistent context information.

Figure 8:
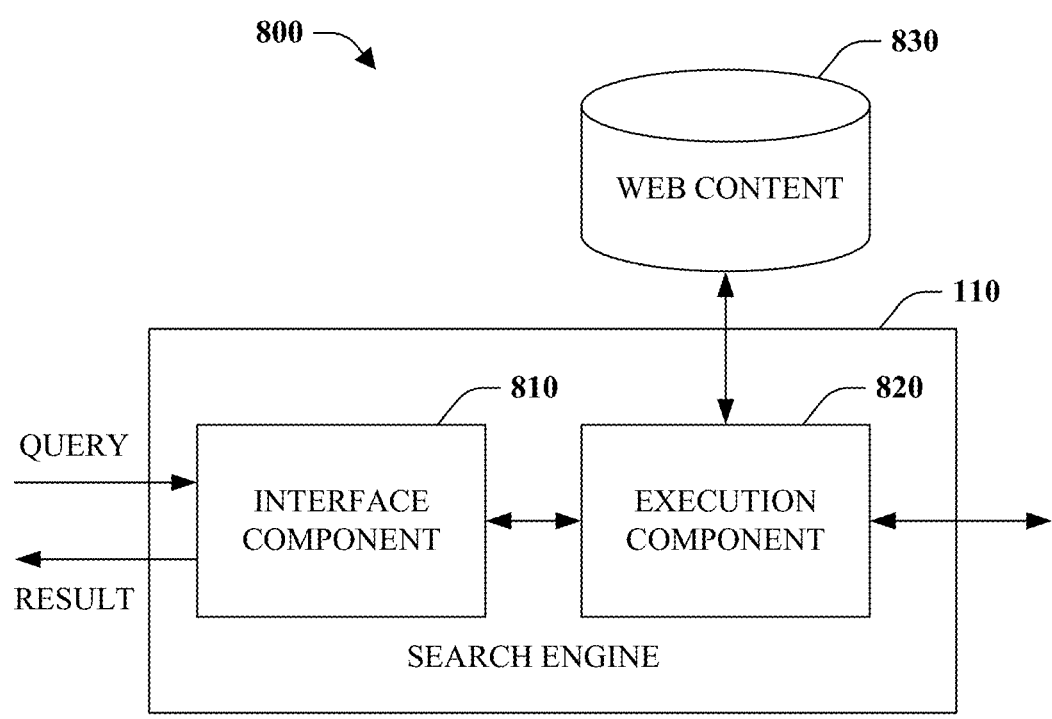
FIG. 8 is a block diagram of a personalized web search system that operates with respect to designated web content.

Turning to FIG. 8, a web search system 800 is shown in accordance with another aspect of the subject innovation. System 800 includes a search engine component 110 comprising an interface component 810 and an execution component 820. The interface component 810 receives, retrieves or otherwise obtains queries and provides results to a requesting entity. Upon receipt of a query, the interface component 810 provides or makes available the query to execution component 820. The execution component 820 evaluates the query and provides the results to the interface component 810. More particularly, the execution component 820 evaluates the query with respect to at least a subset of web content 830 identified by and associated with one or more users. Conventionally, web search engines evaluate queries with respect to the entire web that has been identified by a web crawler. Among other things, the subject innovation enables searches to be evaluated with respect to designated web content, which may include only a subset of web content. This is beneficial for a number of reasons. First, queries can be limited to content trusted or preferred by a user. Additionally, the designated web content can identify content that has not yet been found by a crawler. Thus, system 800 is able to located content that may not otherwise be found by a conventional search system.

Figure 9:
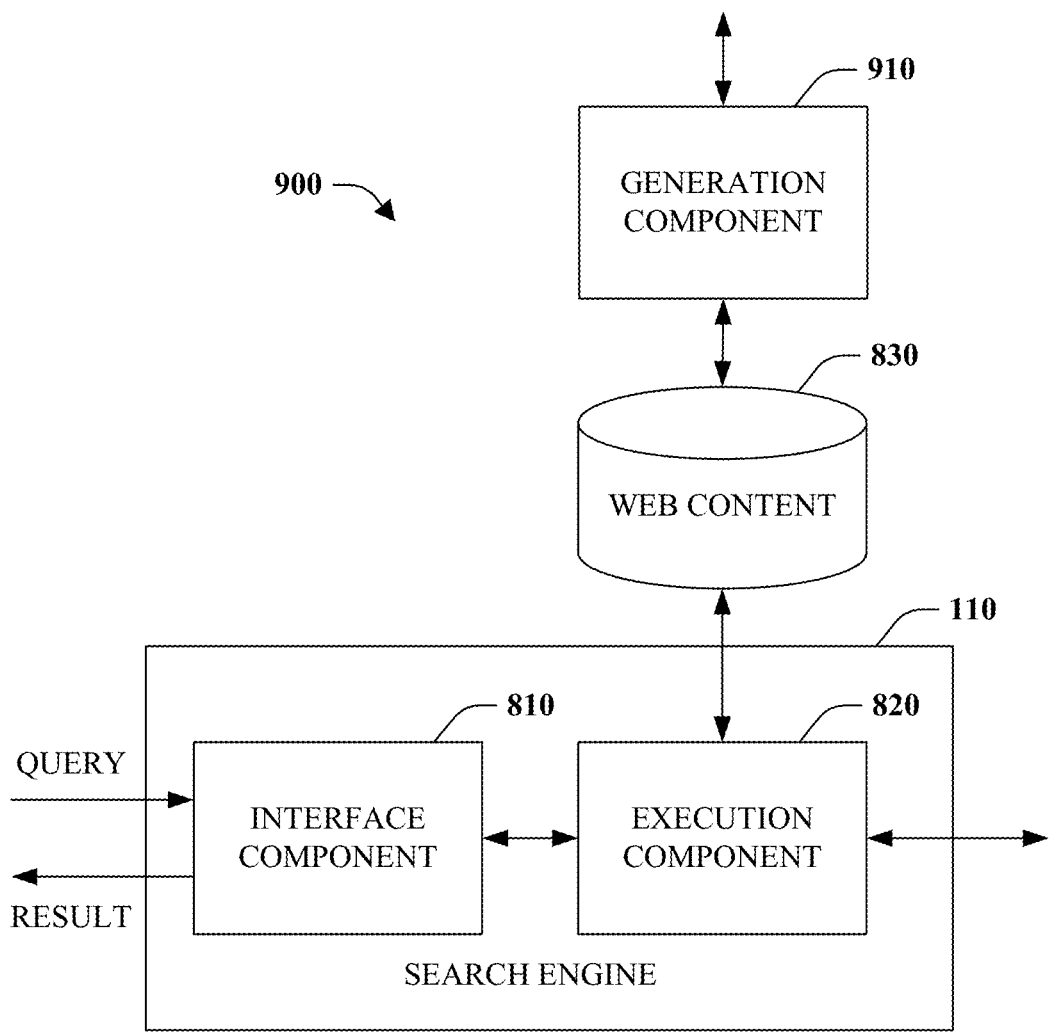
FIG. 9 is a block diagram of a personalized web search system including a generation component for designating web content.

FIG. 9 illustrates a web search system 900 in accordance with an aspect of the innovation. Similar to system 800 of FIG. 8, system 900 can include the search engine component 110 including the interface component 810 and the execution component 820 as well as web content 830. As described previously, the interface component 810 can receive queries provide them to the execution component 820 for evaluation and provide the results from the execution component 820 back to the requesting entity. Moreover, the results are evaluated with respect to select web content 830. System 900 also includes a generation component 910. Component 910 facilitates generation or identification of select web content 830. For example, the generation component may provide a graphical user interface (GUI) or wizard to aid a user in identifying web content over which they would like to search. Additionally or alternatively, such content can be inferred from previous interactions, bookmarked favorites and the like. Still further yet, the select web content 830 can include or be associated with user ranking information that identifies the relevance of content for particular searches to a user. The identified content can then be saved as web content 830. The search engine can then consult web content 830 when evaluating queries. It is also to be appreciated that the generated and saved content 830 can be in the form of an index that facilitates expeditious search and location of such content.

Figure 10:
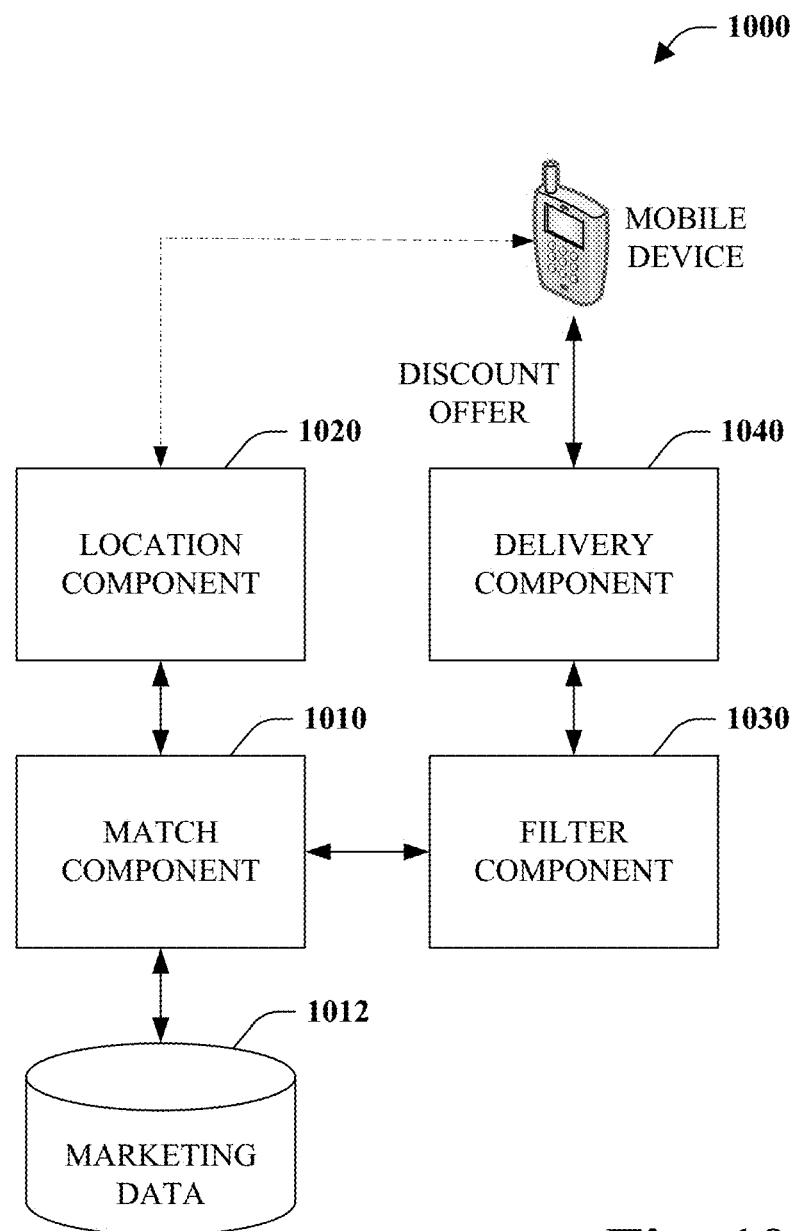
FIG. 10 is a block diagram of a localized marketing system.

Referring to FIG. 10, a localized marketing system 1000 is illustrated in accordance with an aspect of the subject innovation. System 1000 enables market creation between merchants and potential customers based on identified criteria as well as location. The system 1000 includes a match component 1010 that identifies matches between potential customers or system users and merchants. In particular, match component 1010 is communicatively coupled to marketing data store 1012 where user and merchant data is housed and location component 1020 that identifies user locations, for example based on a broadcast signal from a mobile device. The match component 1010 can search or query the store 1012 to identify users and merchants that match desired criteria including location or geographical proximity. These matches can be provided to component 1030 for filtering. The filter component 1030 can identify matches that maximize utility, for instance for one or more of a user, merchant and the marketing system, as will be described further infra. Identified matches are then received or retrieved by the delivery component 1040, which communicates discount offers associated with a matching merchant to associated users. In particular, electronic discount offers can be transmitted to one or more user mobile devices. Delivery component 1040 can be a system that actually transmits messages to a user or a component that simply constructs messages and provides them to a communication system such as but not limited to a short message system for delivery.

For clarity, consider the following example. Assume that a coffee shop decides it would like to offer a dollar off coupon to men in their twenties that are within a two-block radius of the store. Suppose that Joe, a system user, is twenty-five years old and has indicated that he would like to receive special offers from coffee shops within a mile radius. Joe's location can be monitored via any one of a number of geo-location systems. For instance, Joe's smart phone can broadcast his location to the marketing system 1000 or a system/service associated therewith. When Joe is determined to be within a mile of the coffee shop in the subject example nothing happens, since while Joe's conditions have been satisfied, the coffee shop restrictions have not been met. However, when Joe comes within a two-block radius of the coffee shop, an electronic discount can be provided to him by the system. More specifically, Joe can receive a text message including an alphanumeric code indicating that if Joe presents the code to the coffee shop between 5 p.m. and 6 p.m. today, he will receive a dollar off a café latte.

It is to be noted that while Joe may be pushed offers from all merchants for which there is a match, the system can engage in filtering, via filter component 1030, to maximize Joe's utility. For instance, if there are two coffee shops that match his preferences only the higher value offer can be presented (e.g., $2 off coupon over $1 coupon). Likewise, if the discount offers are the same, but one is substantially closer to Joe, then only that offer may be presented.

Alternatively, filtering can be implemented to maximize merchant utility, for instance based on the tightness of a match. For example, the system may transmit a discount offer to a user who is in closer proximity to the store rather than to an individual who is much farther away. Furthermore, a merchant may specify a target group or a relevancy hierarchy that can be employed to restrict distribution of offers.

Discount programs can be designed to optimize the likelihood of long-term revenues by creating patterns of long-term commerce. For example, retailers may attempt to incentivize users, who have never before come to a shop, to learn about a shop by sending time-limited electronic coupons to attract users to come for the first time. Such discounts and time deadlines offered with the coupons can be made functions of the users' current distances away from the shop and/or some estimate of how far off the user's current path adding a waypoint to the shop will be. For example, in one approach, the further away a user is, the greater the discount and the more time until the discount expires.

Such parameters as time until expiration and amount of discount can be optimized so as to maximize the likelihood that a user will come to a shop for the first time, based on an analysis of the behavior of a population of users. Such optimizations can be based on the active study of responses to multiple combinations of parameters, via a methodical and automated probe of the behavior of populations with different discounts and deadlines.

Filtering may also be designed to maximize utility associated with the marketing system itself. In one instance, merchants may compete for introductions to potential customers. For example, merchants within the same market may offer to pay differing amounts to have their offers presented to particular types of users. In such a scenario, offers associated with the highest bidding merchant can be filtered and sent to users. Further, note that alternative costing schemes can be employed to maximize revenue for the marketing system.

It is also to be appreciated that filtering can seek to optimize utility for more than one party or entity. For example, utility can be maximized for two or more of a user, a merchant and the marketing system. An optimization algorithm can be employed to determine the best way to distribute merchant discount offers. Alternatively, a greedy algorithm can be utilized to efficiently identify a solution that approximates an optimal result.

Further yet, note that while an offer can be pushed to a mobile device via SMS or like system, the subject innovation is not so limited. By way of example and not limitation, an alternate embodiment can be utilized in conjunction with web search such that electronic offers appear as advertisements or in another designated portion of a search result page. For instance, if a user issues a search on a mobile device search engine for fast food, matching electronic offers can presented together with results. The innovation has similar utility with respect to alternate technologies including but not limited to email and instant messaging.

Figure 11:
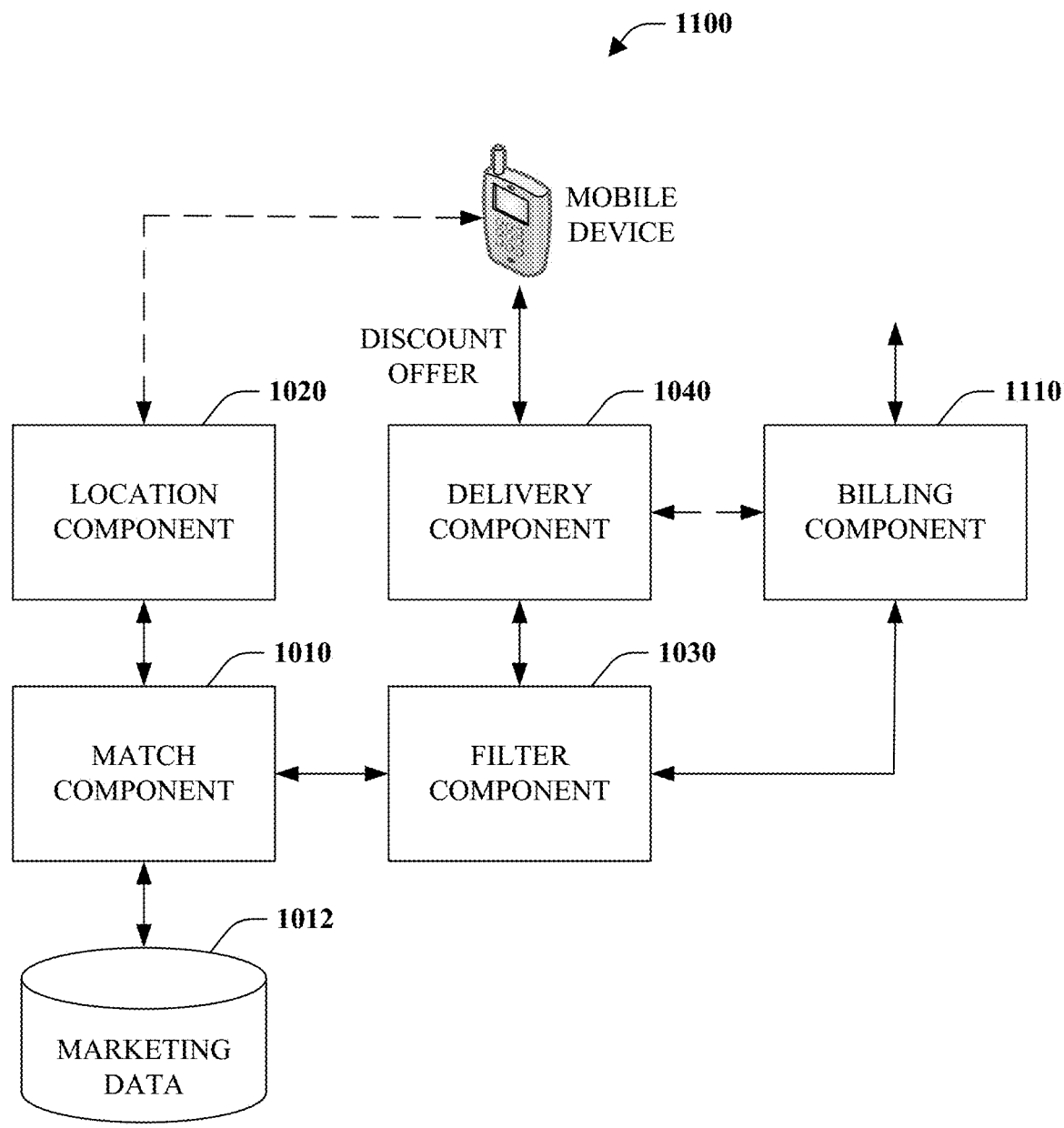
FIG. 11 is a block diagram of a localized marketing system including a billing component.

Referring to FIG. 11, a localized marketing system 1100 is illustrated in accordance with an aspect of the innovation. The marketing system 1100 includes the same components as in system 1000 of FIG. 10 with the addition of a billing component 1110. The billing component 1110 is operable to automatically generate a bill or invoice, among other things for merchants. The filter component 1030 and the delivery component 1040 are communicatively coupled to the billing component 1110. Accordingly, the billing component 1110 can interact with components 1030 and 1040 to facilitate invoice generation. The actual invoice generated will be dependent upon the economic model adopted by a particular system. In accordance, with one aspect of the innovation, merchants can bid on the opportunity to be introduced to specific potential customers. Hence, a price merchant pays depends not only on whether it is a winner in the bidding contest, but also on the particular type of potential customer the bid covers. The billing component 1110 can thus receive an indication of the matching prices for users from filter component 1030. A bill can then be generated upon verification that a merchant's offer has been sent from delivery component 1040. However, the bill can be generated solely upon match and an indication thereof from filter component 1030. Furthermore, billing component 1110 can aggregate fees from a particular period of time and apply discounts to the bill prior to generation. For example, if a merchant spends a specific amount they may be entitled to a percentage discount. Furthermore, it is to be noted that the billing component 1110 can be set up to generate paper or electronic invoices and/or automatically debit accounts. Further yet, the billing component 1110 is not exclusive to merchants and can thus be utilized in a similar fashion to bill users for service, amongst other things.

Figure 12:
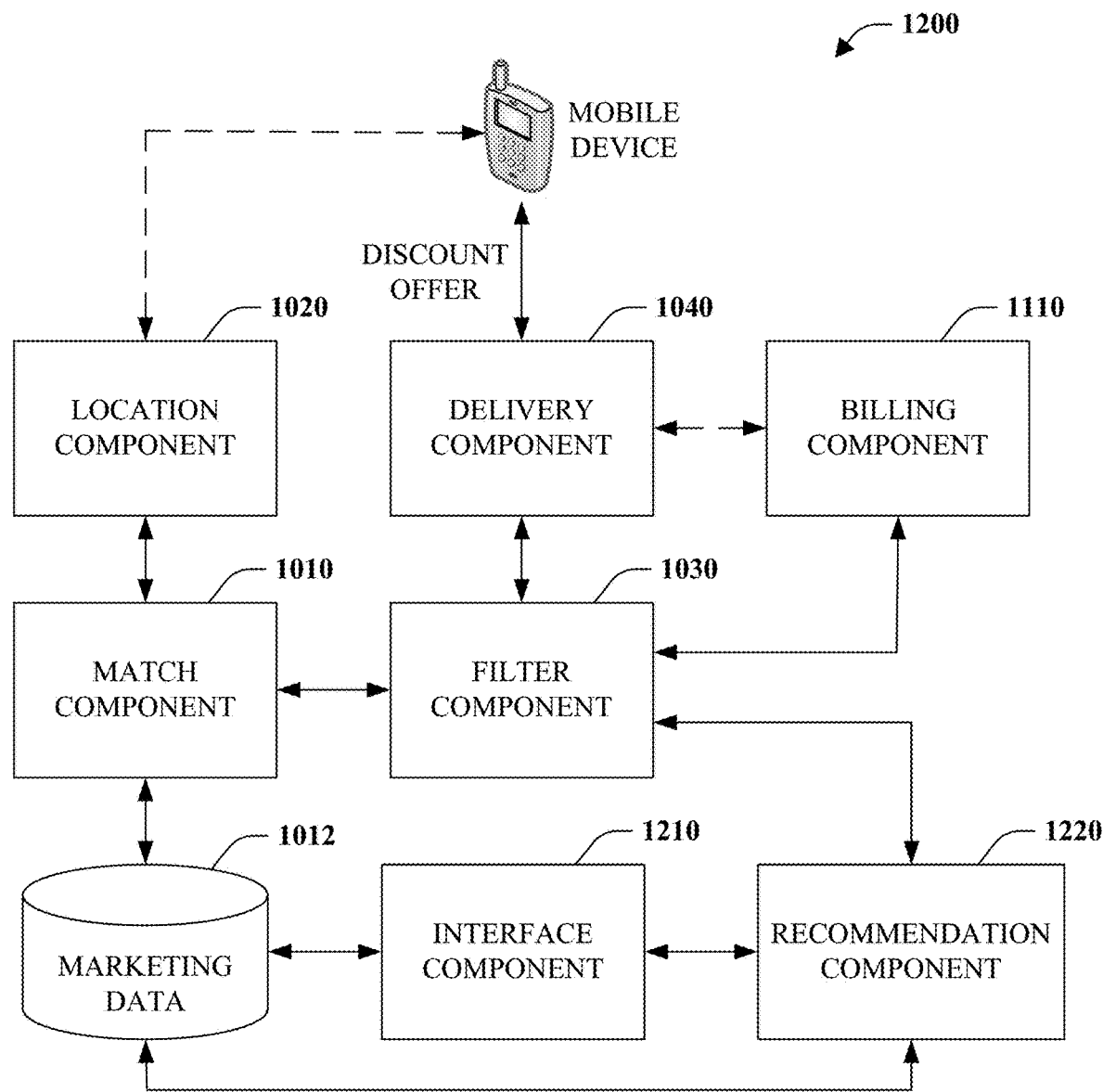
FIG. 12 is a block diagram of a localized marketing system including interface and recommendation components.

Turning attention to FIG. 12, a localized marketing system 1200 is depicted in accordance with an aspect. The system 1200 can include all the components of system 1100 of FIG. 11, as described above, as well as interface component 1210 and recommendation component 1220. The interface component 1210 provides a mechanism to input marketing data into store 1012. Among other things, interface component 1210 can be a graphical user interface, such as a web page. Various textual and graphical objects can facilitate input of constraints to be matched. For example, a user may specify that they are interested in coffee, electronics, groceries and entertainment and would like to be notified of specials when they are within a two block radius (perhaps because they are traveling by foot). Information can also be entered regarding how users would like to be notified and how location can be determined. Merchants can also utilize interface component 1210 to specify their desired matches, offers, bids and billing particulars, inter alia. Accordingly, the interface component 1210 provides a means for automating inclusion within a marketplace for both merchants and users.

The recommendation component 1220 is a mechanism to aid merchants and users in specifying useful matching information. The recommendation component 1220 can function together with the interface component 1210 to facilitate input of settings. For instance, recommendation component 1220 can provide one or more tools or services to maximize merchant budget utility with respect to specifying matching user demographics, proximities, bids and the like. By way of example, a merchant may provide a set budget amount identify potential customers of interest in a market, and the recommendation component can identify to whom offers should be presented, for what amount, and how much the merchant should bid to optimize utility based on the budget. The component 1220 can be communicatively coupled to the filter component 1030 and/or marketing data store 1012 to facilitate analysis of a market including matching characteristics and fees charged, amongst other things. This information can be utilized to recommend certain settings. For instance, if a user indicates that he is interested in video game offers, the recommendation component 1220 can suggest selection of video and/or electronics categories based on a historical/trend analysis that has shown these categories produce those types of offers.

The aforementioned systems have been described with respect to interaction between several components. It should be appreciated that such systems and components can include those components or sub-components specified therein, some of the specified components or sub-components, and/or additional components. For example, context filter component 530 can include user component 610, temporal component 620, current events component 630 and third party component or any combination thereof. Sub-components can also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Furthermore, as will be appreciated, various portions of the disclosed systems above and methods below may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent By way of example and not limitation, such mechanisms can be employed to identify optimized offer parameters (e.g., discounts, coupon expiration . . . ) for a particular objective (e.g., bring in first time shoppers to my retail shop during the next two hours) by performing analysis from data collected from active probes that link parameters with responses.

By way of example and not limitation, the search engine 110 can cache and/or immediately display or convey (e.g., audio) web content such as query results and advertisements based on an inferred or predicted confidence level that a user would desire or need such information at a particular point in time (e.g., by employ utility based analysis that factors the cost of interruption to the user with the expected benefit to the user of such information). Similarly, cached content can be aged and removed to optimize memory space utilization if such data is no longer deemed relevant give a new state/context.

Figure 13:
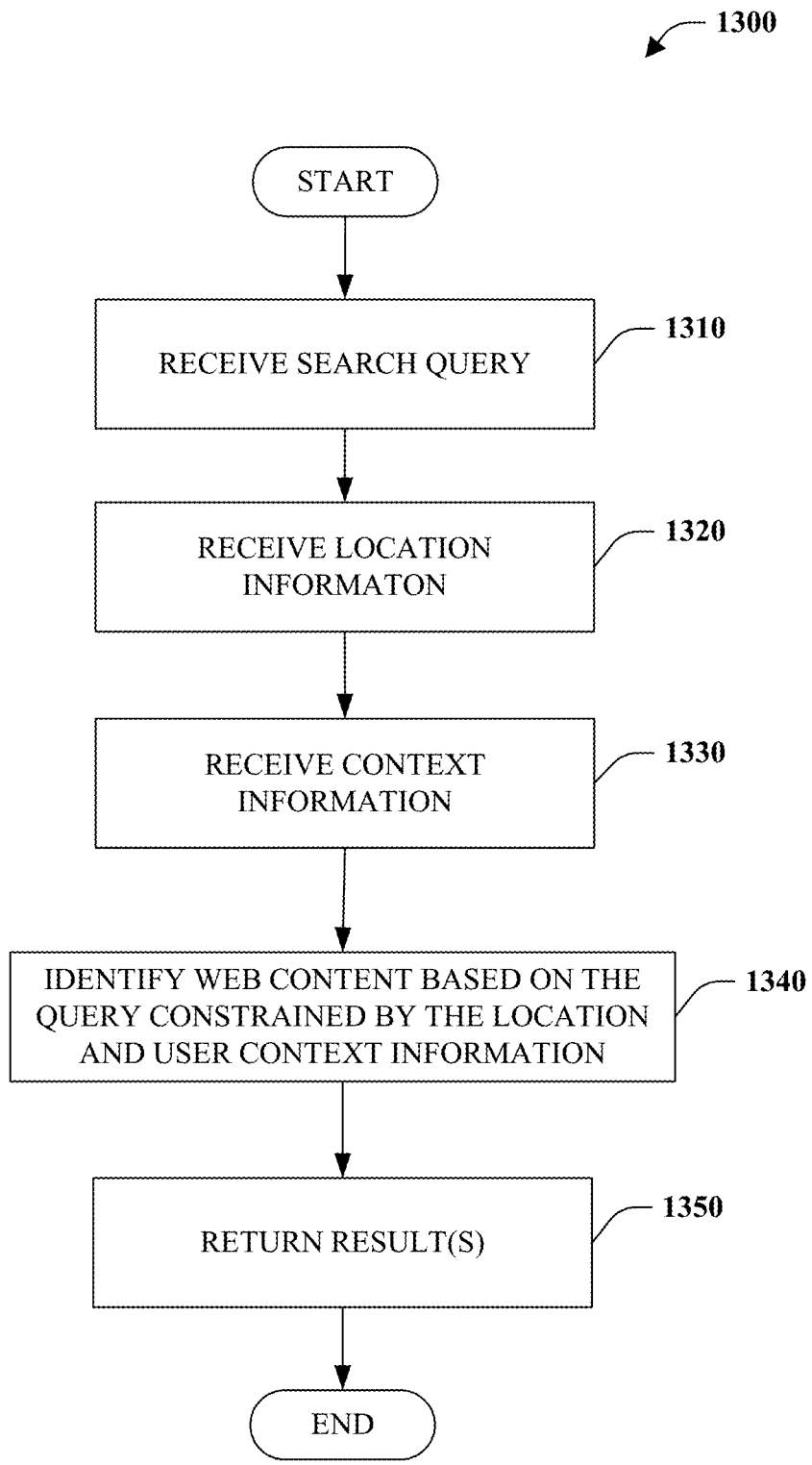
FIG. 13 is a flow chart diagram of a method of web search.
Figure 14:
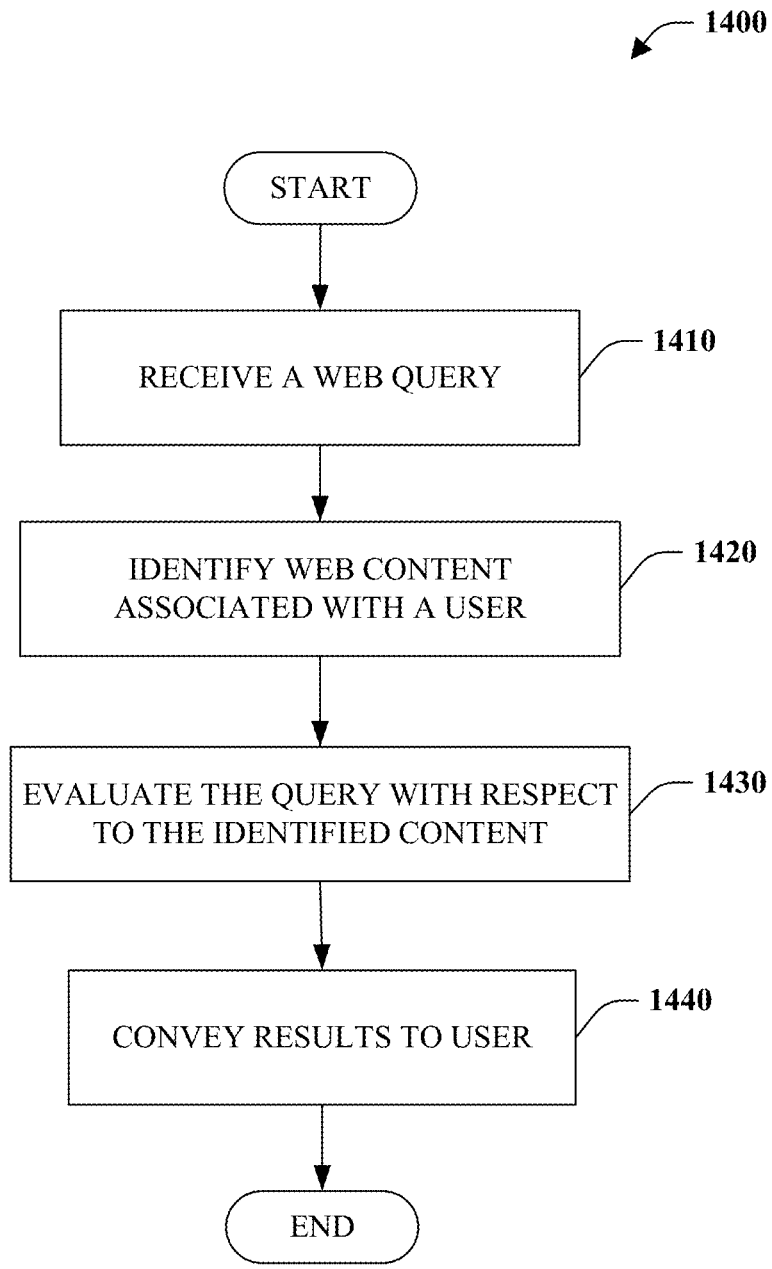
FIG. 14 is a flow chart diagram of web search methodology.
Figure 15:
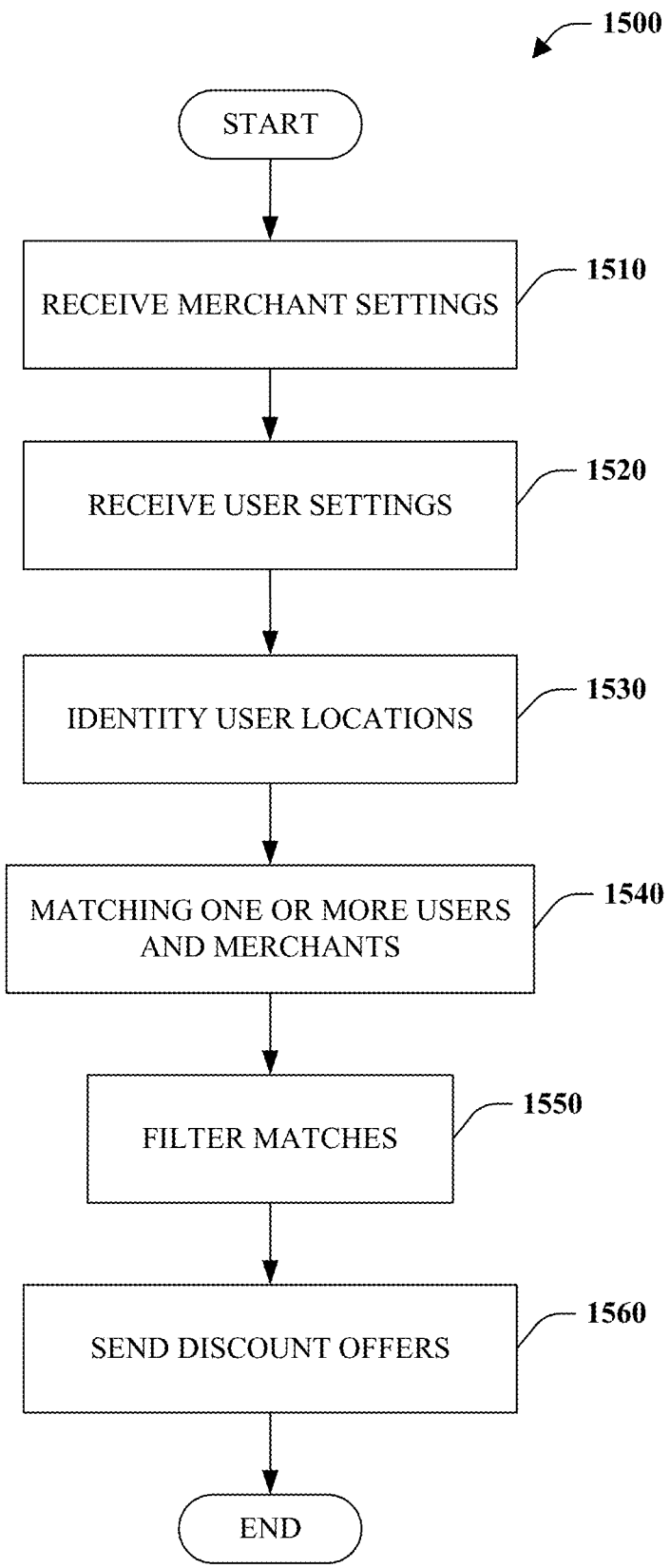
FIG. 15 is a flow chart diagram of a method of dynamic location based marketing.

In view of the exemplary systems described supra, methodologies that may be implemented in accordance with the disclosed subject matter will be better appreciated with reference to the flow charts of FIGS. 13-15. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers.

Referring to FIG. 13, a web search method 1300 is depicted in accordance with an aspect of the subject innovation. At reference numeral 1310, a web query is received. At numeral 1320, location information is received. This information can be associated with a physical location of an entity providing the query or simply an area of interest. For example, sensors can receive or retrieve data corresponding to the location of a user (e.g., via GPS, wireless, RFID . . . ) or alternatively, a user can select an area of interest from a map, among other things. At reference numeral 1330, context information is received or otherwise obtained. Context information can pertain to any circumstances surrounding the query including but not limited to user context (e.g., profile, characteristics, preferences, previous use, attention span, group membership . . . ) temporal context (e.g., season, date, time of day, day of week . . . ), current event context (e.g., local, national, familial or associated group news . . . ) and/or third party context (e.g., state/context of non-user in an associated group, engaged in common activity, part of a working collaboration . . . ). At numeral 1340, the received query is evaluated and constrained or filtered with respect to one or both of location and context. At 1350, the resulting context is returned to a requesting entity, for instance to display to a user. As previously mentioned, it is to be noted that the subject method 1300 can be executed manually when a query is received and/or automatically to enable content to be pushed to a user at various times.

As an example, consider a scenario where a user traveling by bus and desiring to eat enters a query for fast food restaurants. After the user's query is received, the user's location can be identified. Furthermore, based on the starting and stopping detected by an accelerometer it can be inferred that a user is on a bus. Therefore, the search location can be limited to a known or inferred bus route. Context can also be evaluated and employed to further aid in identifying relevant content. For instance, if it is known or can be inferred that the user is Catholic and it is Lent, this information can be employed to further filter relevant fast food restaurants based on the extent of their non-meat menu and user likes and/or dislikes. As a result, the entered fast food query be evaluated and filtered such that the most relevant web content will pertain to restaurants closest to the bus route, which have the best non-meat menu given the users likes and dislikes.

FIG. 14 illustrates a web search methodology 1400 according to another aspect of the innovation. At reference numeral 1410, a web query is received. At 1420, web content associated with a user is identified. For example, a user can identify at least a subset of web content over which queries are to be evaluated utilizing a GUI or wizard to facilitate input. The identified subset can allow a user to receive results they likely desire, among other things. Furthermore, the select web content can in some instances identify content that has not been indexed (if ever) by an engine crawler and therefore is unavailable for query evaluation. Therefore, searches are not bound to what crawlers find. At reference numeral 1430, the received query is evaluated with respect to the identified content. The results are then conveyed to a requesting entity at numeral 1440.

Referring to FIG. 15, a dynamic location based marketing method 1500 is depicted in accordance with an aspect of the subject innovation. Method 1500 can be employed as a service to provide matching merchant discounts to users or service subscribers. At reference numeral 1510, merchant settings can be received. These settings can include user demographics including proximity, offers and bids for introductions, among other things. User settings are received at 1520. These settings can include specification of merchants or classes or categories of merchants from which a user would be interested in receiving offers. Additional information can also be set including a proximity or location, method of notification, and location tracking information, among other things. Both merchant and user settings can be stored for further processing. At numeral 1530, user locations are identified. For example, a service associated with user mobile devices can be contacted to receive geolocation information. Additionally or alternatively, various other means of location can be utilized including proximity sensors to pinpoint user locations. One or more merchants and users are matched at 1540. Matching can be done based on settings and current user locations. At reference numeral 1550, matches are then filtered, for instance to optimize utility of one or more of user(s), merchant(s) and the marketing system. Discount offers can be sent, at 1560, to user devices. In one embodiment, the discount offer can be an electronic coupon including one or more alphanumeric characters that can be provided to a specific merchant to redeem the value thereof. The method 1500 can subsequently terminate. However, it is to be appreciated that the method 1500 likely loop continuously to update, match and filter based on merchant and user settings as well as location. Note that a match may not occur because a user is outside a set distance of a merchant, however, seconds later he/she may be within the boundary and thus a match would occur on the next method loop or iteration.

As used herein, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

Machine learning and reasoning systems (e.g., explicitly and/or implicitly trained classifiers) can be employed in connection with performing inference and/or probabilistic determinations and/or statistical-based determinations as in accordance with one or more aspects of the subject innovation as described hereinafter. As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a method, apparatus, or article of manufacture using standard programming and/or engineering techniques to produce software, firmware, hardware or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards and flash memory devices (e.g., card, stick, jump drive . . . ). Additionally, it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 16:
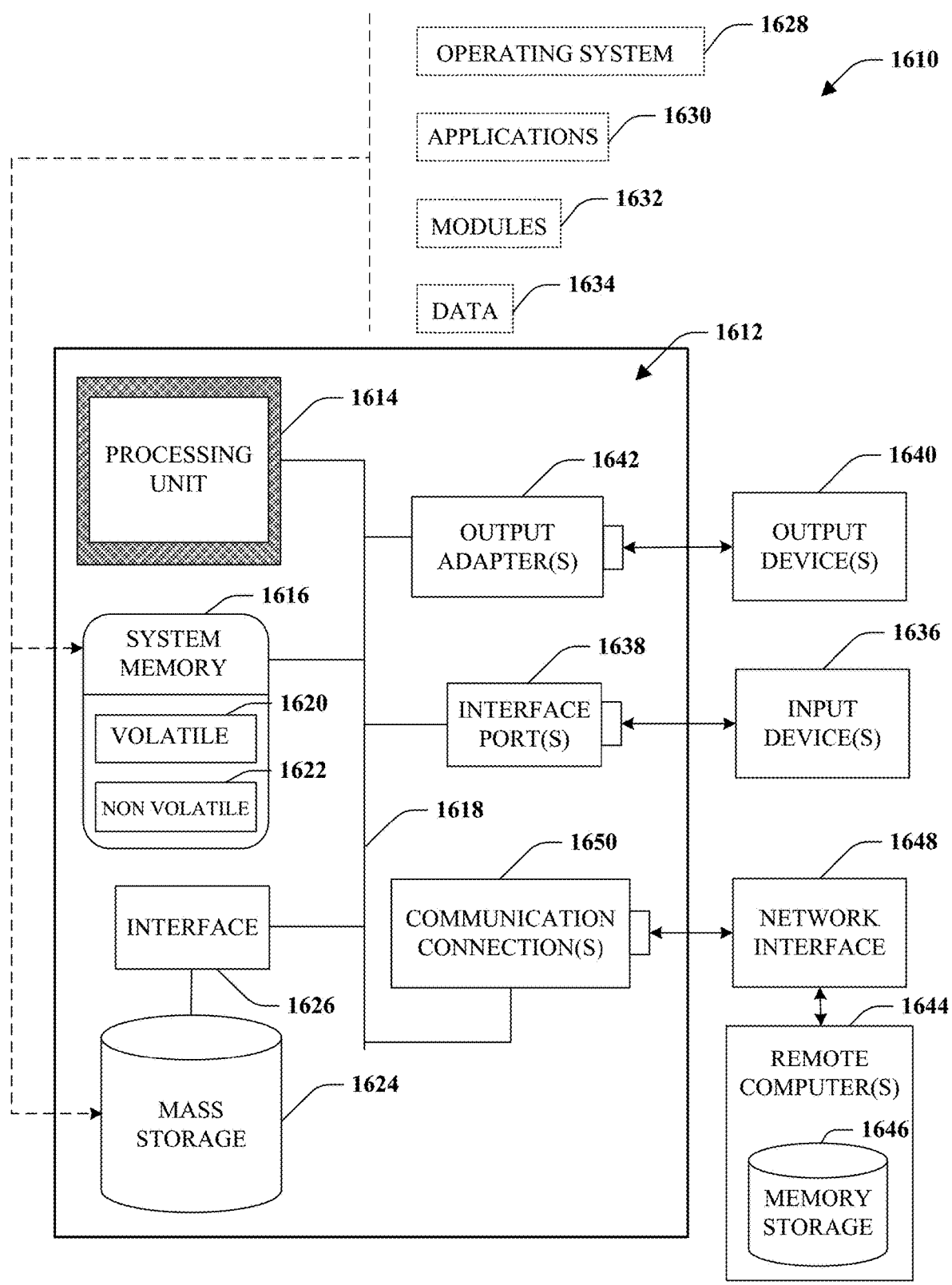
FIG. 16 is a schematic block diagram illustrating a suitable operating environment for aspects of the subject innovation.
Figure 17:
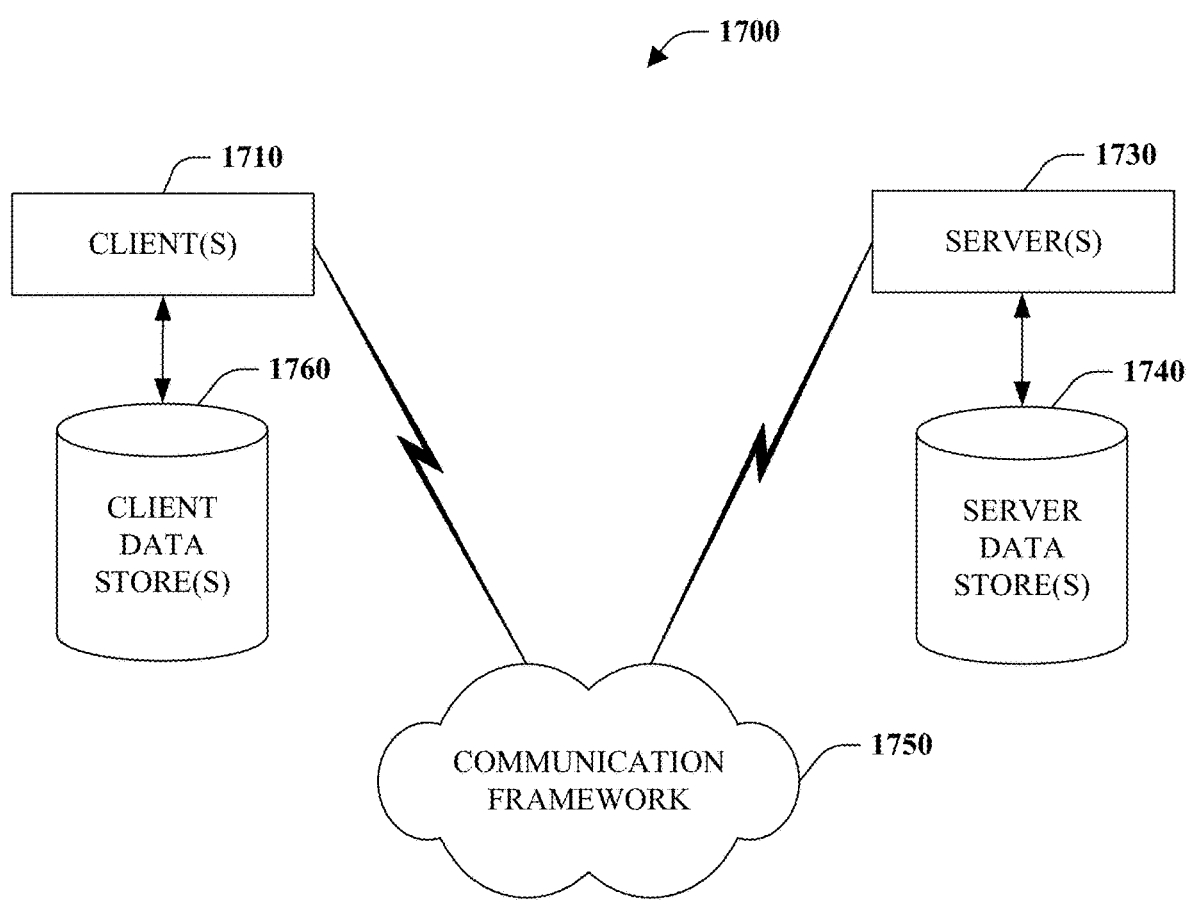
FIG. 17 is a schematic block diagram of a sample-computing environment.

In order to provide a context for the various aspects of the disclosed subject matter, FIGS. 16 and 17 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed innovation can be practiced on stand-alone computers. In a distributed computing environment, program modules may be located in both local and remote memory storage devices.

With reference to FIG. 16, an exemplary environment 1610 for implementing various aspects disclosed herein includes a computer 1612 (e.g., desktop, laptop, server, hand held, programmable consumer or industrial electronics . . . ). The computer 1612 includes a processing unit 1614, a system memory 1616, and a system bus 1618. The system bus 1618 couples system components including, but not limited to, the system memory 1616 to the processing unit 1614. The processing unit 1614 can be any of various available microprocessors. Dual microprocessors and other multiprocessor architectures (e.g., multi-core) also can be employed as the processing unit 1614.

The system bus 1618 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1616 includes volatile memory 1620 and nonvolatile memory 1622. The basic input/output system (BIOS), containing the basic routines to transfer information between elements within the computer 1612, such as during start-up, is stored in nonvolatile memory 1622. By way of illustration, and not limitation, nonvolatile memory 1622 can include read only memory (ROM), programmable ROM (PROM), electrically programmable ROM (EPROM), electrically erasable ROM (EEPROM), or flash memory. Volatile memory 1620 includes random access memory (RAM), which acts as external cache memory.

Computer 1612 also includes removable/non-removable, volatile/non-volatile computer storage media. FIG. 16 illustrates, for example, mass or auxiliary storage 1624. Mass storage 1624 includes, but is not limited to, devices like a magnetic disk drive, floppy disk drive, tape drive, Jaz drive, Zip drive, LS-100 drive, flash memory card, or memory stick. In addition, mass storage 1624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the mass storage devices 1624 to the system bus 1618, a removable or non-removable interface is typically used such as interface 1626.

It is to be appreciated that FIG. 16 describes software that acts as an intermediary between users and the basic computer resources described in suitable operating environment 1610. Such software includes an operating system 1628. Operating system 1628, which can be stored on mass storage 1624 and loaded to system memory 1616, acts to control and allocate resources of the system 1612. System applications 1630 take advantage of the management of resources by operating system 1628 through program modules 1632 and program data 1634 stored either in system memory 1616 or on mass storage 1624. It is to be appreciated that the subject innovation can be implemented with various operating systems or combinations of operating systems.

A user enters commands or information into the computer 1612 through input device(s) 1636. Input devices 1636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1614 through the system bus 1618 via interface port(s) 1638. Interface port(s) 1638 include, for example, a serial port, a parallel port, a game port, and a universal serial bus (USB). Output device(s) 1640 use some of the same type of ports as input device(s) 1636. Thus, for example, a USB port may be used to provide input to computer 1612 and to output information from computer 1612 to an output device 1640. Output adapter 1642 is provided to illustrate that there are some output devices 1640 like displays (e.g., flat panel, CRT, LCD, plasma . . . ), speakers, and printers, among other output devices 1640 that require special adapters. The output adapters 1642 include, by way of illustration and not limitation, video and sound cards that provide a means of connection between the output device 1640 and the system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. The remote computer(s) 1644 can be a personal computer, a server, a router, a network PC, a workstation, a microprocessor based appliance, a peer device or other common network node and the like, and typically includes many or all of the elements described relative to computer 1612. For purposes of brevity, only a memory storage device 1646 is illustrated with remote computer(s) 1644. Remote computer(s) 1644 is logically connected to computer 1612 through a network interface 1648 and then physically connected (e.g., wired or wirelessly) via communication connection 1650. Network interface 1648 encompasses communication networks such as local-area networks (LAN) and wide-area networks (WAN).

Communication connection(s) 1650 refers to the hardware/software employed to connect the network interface 1648 to the bus 1618. While communication connection 1650 is shown for illustrative clarity inside computer 1616, it can also be external to computer 1612. The hardware/software necessary for connection to the network interface 1648 includes, for exemplary purposes only, internal and external technologies such as, modems including regular telephone grade modems, cable modems, power modems and DSL modems, ISDN adapters, and Ethernet cards or components.

FIG. 17 is a schematic block diagram of a sample-computing environment 1700 with which the subject innovation can interact. The system 1700 includes one or more client(s) 1710. The client(s) 1710 can be hardware and/or software (e.g., threads, processes, computing devices). The system 1700 also includes one or more server(s) 1730. Thus, system 1700 can correspond to a two-tier client server model or a multi-tier model (e.g., client, middle tier server, data server), amongst other models. The server(s) 1730 can also be hardware and/or software (e.g., threads, processes, computing devices). The servers 1730 can house threads to perform transformations by employing the subject innovation, for example. One possible communication between a client 1710 and a server 1730 may be in the form of a data packet transmitted between two or more computer processes.

The system 1700 includes a communication framework 1750 that can be employed to facilitate communications between the client(s) 1710 and the server(s) 1730. The client(s) 1710 are operatively connected to one or more client data store(s) 1760 that can be employed to store information local to the client(s) 1710. Similarly, the server(s) 1730 are operatively connected to one or more server data store(s) 1740 that can be employed to store information local to the servers 1730.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. A web search system comprising:
   a memory;
   a processor in communication with the memory, the processor operable to execute:
   a location component that limits a query to a geographic region surrounding the present physical location of a user, wherein a size of the geographic region being determined based at least in part on a selection;
   a context component that limits the query to context information based on user information in a user profile;
   a search component, in communication with the location component and the context component, wherein the search component identifies relevant web content in accordance with the query, wherein the query is modified by the geographical region and first context information;
   a filtering component, in communication with the search component, wherein the filtering component receives search results and reorders the results based on second context information and third context information, wherein the third context information is associated with one or more people associated with a group that includes the user, wherein the user is engaged in a same activity with the one or more people associated with the group, wherein the second context is at least associated with a location of the one or more people, and wherein the location is in or in proximity to the geographical region; and
   providing the reordered results for display to the user.

2. The system of claim 1, wherein the location component includes a determination component that automatically identifies the location of a user based on data provided by one or more sensors.

3. The system of claim 2, wherein the one or more sensors receive or retrieve one or more of GPS, Wi-Fi, RFID, proximity and acceleration data.

4. The system of claim 1, wherein the location component includes a determination component that identifies at least one bounded region specified by the user.

5. The system of claim 1, wherein the location component includes a determination component that determines a bounded region based at least in part on the query.

6. The system of claim 1, wherein the user information identifies characteristics of the user including at least one of age, gender, ethnicity, education level and political affinity.

7. The system of claim 1, wherein the user information includes maximum cognitive load or attention span that is employed to limit the amount of content provided at one time.

8. The system of claim 1, wherein the user information includes one of previous searches and selected content.

9. The system of claim 1, wherein the context component also filters the web content based on one of current events and temporal data.

10. The system of claim 1, a third-party component, in communication with the search component, wherein the third-party component alters the relevant web content provided to the user based on the third context information.

11. A method that facilitates interacting with web content comprising the following computer-implemented acts:
identifying, by a processor, a location based on a present physical location of a user;
identifying, by the processor, first user information based at least in part on a user profile;
conducting, by the processor, a web search query based on a bounded region, including the identified location, and the identified first user information;
receiving, by the processor, results from the web search query;
reordering, by the processor, the results based on second user information and first context information, wherein the second user information is associated with a group comprising one or more people and the user and the user and the one or more people are engaged in a same activity, wherein the first context information is at least associated with a location of the one or more people and wherein the location is in or in proximity to the bounded region; and
providing the reordered results for display to the user.

12. The method of claim 11, wherein the web search queries are modified based on one or more of user age, gender, education, ethnicity, religion, and political affiliation.

13. The method of claim 11, wherein the web search queries are modified based on historical click through.

14. The method of claim 11, further comprising filtering advertisements displayed with search results based on one or more of the identified location and the identified user information.

15. The method of claim 11, further comprising receiving a user-selected portion of a map that specifies the identified location.

16. The method of claim 11, further comprising determining the bounded region based on the identified location of the user.

17. The method of claim 16, further comprising adjusting the bounded region based on the query.

18. The method of claim 11, further comprising limiting the number of results returned based on user tolerance.

19. The method of claim 11, further comprising filtering search results based on a second context.

20. A system to facilitated web-based search comprising:
a memory having instructions stored thereon;
a processor in communication with the memory, wherein the instructions, when read by the processor, causes the processor to
identify a present location of a user;
identify a user context based at least in part on a user profile;
limit a search query based on the identified present location;
limit the search query based on an identified first user context-;
receive results from the search;
eliminate a search result from the received results;
reorder the remaining received results based on second context information and third context, wherein the second context information comprises information associated with one or more people associated with a group that includes the user and wherein the third context information is associated with a location of the one or more people and wherein the location is in or in proximity to a geographical region where the user is located;
and
provide the reordered search results for display to the user.

* * * * *